[12] United States Patent
Zhou et al.

(10) Patent No.: US 9,654,960 B2
(45) Date of Patent: May 16, 2017

(54) SERVER-ASSISTED DEVICE-TO-DEVICE DISCOVERY AND CONNECTION

(71) Applicant: QUALCOMM Incorporated, San Diego, CA (US)

(72) Inventors: Yan Zhou, San Diego, CA (US); George Cherian, San Diego, CA (US); Santosh Paul Abraham, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

(21) Appl. No.: 14/254,387

(22) Filed: Apr. 16, 2014

(65) Prior Publication Data
US 2014/0357269 A1 Dec. 4, 2014

Related U.S. Application Data

(60) Provisional application No. 61/829,786, filed on May 31, 2013.

(51) Int. Cl.
H04W 48/14 (2009.01)
H04W 84/18 (2009.01)
(Continued)

(52) U.S. Cl.
CPC ......... *H04W 8/005* (2013.01); *H04W 76/023* (2013.01)

(58) Field of Classification Search
CPC ..... H04W 48/08; H04W 48/14; H04W 84/18; H04W 84/22
(Continued)

(56) References Cited

U.S. PATENT DOCUMENTS 8,509,753 B2 * 8/2013 Chandra .............. H04W 4/023
455/41.2
2006/0168343 A1 * 7/2006 Ma ...................... H04W 52/38
709/245
(Continued)

FOREIGN PATENT DOCUMENTS

WO  WO 2013/172755 A1 * 11/2013 ............ H04W 8/00
WO  WO 2014/054986 A1 *  4/2014 ........... H04W 76/02

OTHER PUBLICATIONS

"General Considerations for D2D Discovery", Alcatel-Lucent, R1-132067, 3GPP TSG-RAN1 Meeting #73, Fukuoka, Japan, May 20-24, 2013, 4 pages.
(Continued)

*Primary Examiner* — Christopher M Brandt
(74) *Attorney, Agent, or Firm* — Toler Law Group, PC

(57) ABSTRACT

A method includes receiving, at a network node, a device-to-device D2D discovery request from a first device and sending a D2D discovery response from the network node to the first device. The D2D discovery response includes information associated with a second device that is available to establish a D2D connection with the first device. The network node may perform inquiries regarding D2D connection permission from both devices. If D2D connection is permitted by both devices, the network node may facilitate the D2D scanning by sending each device's scanning information to the other device via a non-D2D link. In parallel to D2D scanning, the network node may speed up D2D link setup by distributing, via non-D2D links, link setup information to each device, where the link setup information may include device credential(s), IP address allocation(s), and/or group owner assignment.

28 Claims, 12 Drawing Sheets

(51) Int. Cl.
*H04W 8/00* (2009.01)
*H04W 76/02* (2009.01)

(58) Field of Classification Search
USPC .............................. 455/41.2, 552.1, 553.1
See application file for complete search history.

(56) References Cited

U.S. PATENT DOCUMENTS

| | | | | |
|---|---|---|---|---|
| 2009/0172274 A1* | 7/2009 | Nochimowski | ..... | G06F 12/0806 711/114 |
| 2009/0254602 A1* | 10/2009 | Yoshida | ................ | G06F 3/126 709/202 |
| 2009/0264070 A1* | 10/2009 | Lim | ................ | G06Q 30/0261 455/41.2 |
| 2009/0327244 A1* | 12/2009 | Rizal | ................ | G06F 17/30017 |
| 2011/0255444 A1* | 10/2011 | Soliman | ................ | H04L 41/12 370/255 |
| 2013/0029712 A1 | 1/2013 | Shao et al. | | |
| 2013/0288668 A1* | 10/2013 | Pragada | ................ | H04W 12/06 455/426.1 |
| 2014/0045422 A1* | 2/2014 | Qi | ................ | H04W 76/023 455/39 |
| 2014/0066018 A1* | 3/2014 | Zhu | ................ | H04W 4/008 455/411 |
| 2014/0092885 A1* | 4/2014 | Venkatachalam | ... | H04W 76/023 370/338 |
| 2014/0120837 A1* | 5/2014 | Abiri | ................ | H04W 28/02 455/41.2 |
| 2014/0141826 A1* | 5/2014 | Cordeiro | ................ | H04W 48/14 455/509 |
| 2014/0192737 A1* | 7/2014 | Belghoul | ................ | H04W 4/008 370/329 |
| 2014/0206322 A1* | 7/2014 | Dimou | ................ | H04W 4/005 455/414.1 |
| 2014/0206348 A1* | 7/2014 | Johnsson | ................ | H04W 8/005 455/434 |
| 2014/0213186 A1* | 7/2014 | Gage | ................ | H04W 4/023 455/41.2 |
| 2014/0219095 A1* | 8/2014 | Lim | ................ | H04W 72/085 370/235 |
| 2015/0156619 A1* | 6/2015 | Fodor | ................ | H04W 8/005 455/434 |
| 2015/0245397 A1* | 8/2015 | Sachs | ................ | H04W 76/023 455/426.1 |
| 2015/0382174 A1* | 12/2015 | Guo | ................ | H04W 8/005 370/311 |

OTHER PUBLICATIONS

"Discussion on D2D Discovery", ETRI, R1-132556, 3GPP TSG RAN WG1 Meeting #73, Fukuoka, Japan, May 20-24, 2013, 3 pages.

"Discussion on Design Options for D2D Discovery", Intel Corporation, R1-131924, 3GPP TSG RAN WG1 Meeting #73, Fukuoka, Japan, May 20-24, 2013, 6 pages.

International Search Report and Written Opinion—PCT/US2014/034525—ISA/EPO—Oct. 8, 2014, 15 pages.

"Device Discovery in Network Coverage", LG Electronics, R1-132248, 3GPP TSG RAN WG1 Meeting #73, Fukuoka, Japan, May 20-24, 2013, 4 pages.

* cited by examiner

800

802
Receive, at a network node, a device-to-device (D2D) discovery request from a first device

804
Send a D2D discovery response from the network node to the first device, where the D2D discovery response includes information associated with a second device that is available to establish a D2D connection with the first device

*FIG. 8*

900

902
Send a D2D discovery request from a first device to a network node

904
Receive a D2D discovery response at the first device from the network node, where the D2D discovery response includes information associated with a second device that is available to establish a D2D connection with the first device

*FIG. 9*

SERVER-ASSISTED DEVICE-TO-DEVICE DISCOVERY AND CONNECTION

I. CROSS-REFERENCE TO RELATED APPLICATIONS

The present application claims priority from U.S. Provisional Patent Application No. 61/829,786 filed on May 31, 2013, the contents of which are expressly incorporated by reference in their entirety.

II. FIELD

The present disclosure relates to device-to-device discovery and connection.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Wireless devices typically access the Internet via a wireless local area network (WLAN) that includes at least one access point (AP). The AP may be responsible for performing network management tasks, such as IP address allocation. When an AP is present in a WLAN, messages between two wireless devices in the WLAN may flow through the AP. Some wireless devices may support device-to-device (D2D) connection. For example, the devices may be compatible with a Wi-Fi Direct standard, which enables wireless devices to communicate with each other without an intermediating AP. To setup a D2D connection, a searching device may broadcast a discovery message (e.g., a probe request message) to all neighboring devices that are within range of the searching device. If a neighboring device is available for D2D connection, the neighboring device may send a discovery response message (e.g., a probe response message) to the searching device. After the devices find each other, i.e., after discovery is completed, D2D link setup is performed by the devices. The link setup may involve coordinated manual operations on the searching device and the neighboring device. For example, if Wi-Fi Protected Setup (WPS) is in use, a user of one device may need to read and key-in an identifier (e.g., PIN) of the other device. Alternately, the users of both devices may need to push a WPS button on their respective devices. Thus, existing D2D discovery and link setup operations may be cumbersome and time consuming (e.g., may take 5-10 seconds or more). Further, D2D discovery and link setup may involve multiple messaging exchanges between the devices, which consumes power (e.g., battery power) at the devices and contributes to wireless medium congestion.

IV. SUMMARY

Systems and methods of performing node-assisted D2D discovery and connection are disclosed. For example, the described node-assisted techniques may involve three steps: node-assisted device discovery, node-assisted permission verification, and node-assisted link setup. The node (e.g., network node or network device) may be a server, an access point, a network controller, a mobile station, or other device that is distinct from the devices establishing the D2D connection.

In the first step, a node (e.g., a server) may assist a searching device in finding a neighbor device that is willing to establish a D2D connection. The server may be an Internet-accessible server that is able to communicate with both the searching device and the neighbor device via non-D2D (e.g., cellular) links. To illustrate, the searching device may send the server a discovery request via the non-D2D link, where the discovery request includes information associated with the searching device (e.g., an identifier (ID), a location, etc.) and search criteria (e.g., desired services to be provided by candidate neighboring devices). The server may respond to the discovery request with a discovery response that includes a list of candidate neighbor devices. In one implementation, the server may determine the list of candidate neighbor devices based on information stored at the server. Alternately, the server may query APs near the searching device for potential neighbor devices in range of the APs and forward information regarding such neighbor devices to the searching device.

In the second step, the server may perform D2D permission verification. For example, the server may confirm with the searching device that a D2D connection to the neighbor device is permitted, and vice versa. Alternately, if both devices are present on a connection whitelist, the server may skip permission verification.

In the third step, the server may assist in D2D link setup by distributing scanning information and link information to the searching device and to the neighboring device. For example, the server may provide each device with scanning information associated with the other device, such as a listening channel number, a wake-up schedule, a beacon transmission schedule, etc. The scanning information may be used by the devices to more efficiently set up the D2D link. The server may also distribute link information to the devices, such as group owner identification, credentials (e.g., pre-shared key (PSK), certificates, etc.) that can be used by each of the devices to generate D2D encryption keys, and IP address allocations.

By assisting in D2D discovery, permission verification, and link setup operations, the server may enable D2D connections (e.g., Wi-Fi Direct connections) to be established between devices with reduced power consumption and reduced messaging between the devices.

In a particular embodiment, a method includes receiving, at a network node, a D2D discovery request from a first device and sending a D2D discovery response from the network node to the first device. The D2D discovery response includes information associated with a second device that is available to establish a D2D connection with the first device.

In another particular embodiment, a method includes sending a D2D discovery request from a first device to a network node and receiving a D2D discovery response at the first device from the network node. The D2D discovery response includes information associated with a second device that is available to establish a D2D connection with the first device.

In another particular embodiment, a method includes receiving, at an AP, a D2D discovery request from a network node, where the D2D discovery request includes information associated with a first device. The method also includes sending from the access point to the network node a D2D discovery response including information associated with a second device that is in communication with the access point and that is available to establish a D2D connection with the first device.

In another particular embodiment, an apparatus includes a processor and a memory storing instructions executable by the processor to perform operations including sending information associated with a second device from the second device to a network node. The information associated with the second device is useable by the network node to respond to a D2D discovery request associated with a first device that is available to establish a D2D connection with the second device.

In another particular embodiment, a computer-readable storage device stores instructions that, when executed by a processor, cause the processor to perform operations including performing, at a network node, first permission verification with respect to a first device prior to establishment of a D2D connection between the first device and a second device. Performing the first permission verification includes determining whether the second device is included in a first whitelist of the first device and, in response to determining that the second device is not included in the first whitelist, sending a first permission request to the first device.

In another particular embodiment, an apparatus includes means for sending first scanning information from a network node to a first device. The first scanning information is to be used by the first device to establish a D2D connection with a second device. The apparatus also includes means for sending scanning information from the network node to the second device, where the second scanning information is to be used by the second device to establish the D2D connection with the first device.

In another particular embodiment, a method includes receiving, at a network node, a D2D discovery request from a first device. The method also includes sending a D2D discovery response from the network node to the first device. The D2D discovery response includes information associated with a second device that is available to establish a D2D connection with the first device. The method further includes selectively sending a permission request to the first device or to the second device based on a determination that the other of the first device or the second device is not included in a whitelist. The method includes sending scanning information and link setup information from the server to at least one of the first device or the second device. The scanning information and the link setup information are to be used to establish the D2D connection One particular advantage provided by at least one of the disclosed embodiments is an ability to perform node-assisted D2D discovery, permission verification, and link setup. By assuming complete or partial responsibility for such operations, a node may reduce power consumption and messaging exchanges at prospective endpoints (e.g., devices) of a D2D communication link.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 8 is a flowchart to illustrate a particular embodiment of a method of operation at the system of FIG. 1;

FIG. 9 is a flowchart to illustrate another particular embodiment of a method of operation at the system of FIG. 1;

VI. DETAILED DESCRIPTION

Figure 1:
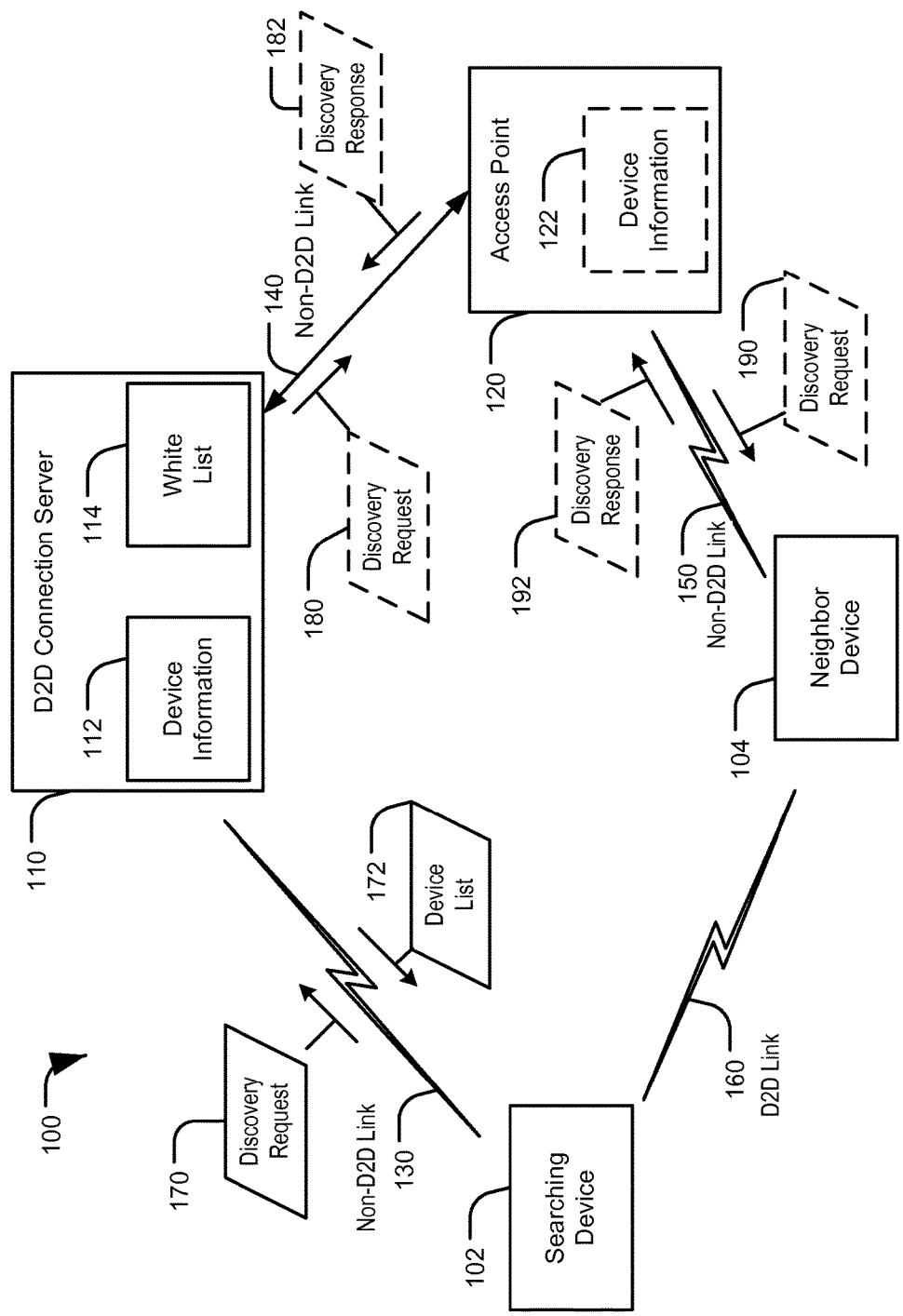
FIG. 1 is a block diagram to illustrate a particular embodiment of a system that is operable to perform node-assisted device-to-device discovery and connection.

Referring to FIG. 1, a diagram illustrating a particular embodiment of a system that is operable to perform node-assisted device-to-device discovery and connection is shown and designated 100. As shown in FIG. 1, the system 100 includes a first device 102 (e.g., a mobile communication device, a tablet computing device, etc.), a second device 104 (e.g., a mobile communication device, a tablet computing device, etc.), a network node or network device (illustrated in FIG. 1 as a device-to-device (D2D) connection server 110), and an access point 120. In alternate embodiments, the network node/network device may be an access point (e.g., the access point 120 or another access point), a network controller, a mobile device or mobile station, or another network-accessible device that is distinct from the first device 102 and the second device 104. Thus, various operations described herein as being performed by the D2D connection server 110 may alternately be performed by other types of network nodes or network devices.

The first device 102 may communicate with the D2D connection server 110 via a non-D2D communication link 130 (e.g., a cellular communication link and/or an infrastructure Wi-Fi connection). The D2D connection server 110 may communicate with the access point 120 via a non-D2D communication link 140 (e.g., a cellular communication link, a wired internet connection, or an infrastructure Wi-Fi connection), and the access point 120 may communicate with the second device 104 via a non-D2D link 150 (e.g., a cellular communication link or an infrastructure Wi-Fi connection). It should be noted that whereas the access point 120 may be located relatively close to (e.g., within WLAN communication range of) the second device 104 (and perhaps the first device 102), the D2D connection server 110 may be located remote to (e.g., outside WLAN communication range of) the devices 102 and 104.

The D2D connection server 110 may be configured to facilitate the establishment of a D2D connection between the first device 102 and the second device 104. For example, the D2D connection server 110 may be configured to perform operations (e.g., discovery, permission verification, link setup, credential distribution, etc.) associated with the establishment of a D2D communication link 160 between the first device 102 and the second device 104. In an illustrative embodiment, the D2D communication link 160 may be a Wi-Fi Direct connection. The Wi-Fi Direct connection may enable devices (e.g., the first device 102 and the second device 104) to communicate with each other directly using one or more wireless communication protocols (e.g., a wireless institute of electrical and electronics engineers (IEEE) 802.11(a) protocol, a 802.11(g) protocol, a wireless 802.11(n) protocol, etc.) without use of a dedicated intervening access point. In another embodiment, the D2D communication link 160 may be a Bluetooth communication link or some other D2D communication link.

Node-Assisted (e.g., Server-Assisted) D2D Discovery

During operation, the first device 102 may send a discovery request 170 to the D2D connection server 110. The discovery request 170 corresponds to a request to identify neighboring devices of the first device 102 that are available to establish a D2D communication link. Thus, as denoted in FIG. 1, the first device 102 may be a "searching" device and other nearby devices, such as the second device 104, may be "neighbor" devices. In an illustrative embodiment, neighbor devices correspond to devices that are within a threshold distance of the first device 102. The threshold distance may correspond to a maximum communication range of a transmitter (e.g., a transmitter configured to communicate using a wireless 802.11(a)/(g)/(n) protocol) of the first device 102. In an illustrative embodiment, the threshold distance may be fifty (50) meters. In another embodiment, the threshold distance may be greater than, or less than, fifty (50) meters. The threshold distance may be user-configurable or may be pre-programmed in accordance with a wireless communication standard. In a particular embodiment, the threshold distance may be dynamically determined. For example, different devices may have different threshold coverage distances due to different transmit powers and receiver sensitivities. Thus, the first device 102 may dynamically estimate its threshold distance based on its own transmit power and an assumed receiver sensitivity (which may be its own sensitivity or may correspond to a minimum required sensitivity according to a wireless standard, such as an IEEE 802.11 standard). For example, the first device 102 may indicate a threshold of fifty (50) meters at twenty (20) decibel-milliwatt (dBm) transmit power and a threshold of thirty (30) meters at fifteen (15) dBm.

The discovery request 170 may include discovery request information that may be used by the D2D connection server 110 to facilitate the establishment of a D2D communication link. In a particular embodiment, the discovery request information may include information that identifies a location of the first device 102, a threshold proximity of candidate neighbor devices to the first device 102, one or more services to be provided by candidate neighbor devices, transmit power of the first device, receiver sensitivity of the first device, or any combination thereof. The transmit power and the receiver sensitivity may be used by other devices to more accurately estimate coverage (e.g., communication range) of the first device 102. In an illustrative embodiment, the desired proximity may correspond to the threshold distance of the transmitter of the first device 102 (e.g., fifty meters).

In an illustrative embodiment, the one or more services may include a gaming service. For example, the second device 104 may be a gaming console and the first device 102 may access the gaming console to initiate a single-player or multi-player gaming session at the gaming console via the D2D communication link 160. Additionally, or alternatively, the second device 104 may be a mobile communication device or other electronic device (e.g., a tablet, a personal computer, a laptop, etc.), and the gaming service may enable the first device 102 and the second device 104 to engage in a multi-player gaming session via the D2D communication link 160.

In an illustrative embodiment, the one or more services may include a printing service. For example, the second device 104 may be a printing device (e.g., two-dimensional or three-dimensional printer), and the first device 102 may send data to the printing device via the D2D communication link 160 for printing.

In an illustrative embodiment, the one or more services may include a remote display service that enables the first device 102 to transmit data to the second device 104 via the D2D communication link 160 for display at a display device incorporated into, or accessible to, the second device 104. For example, the second device 104 may be a projector and the first device 102 may transmit the data to the projector for display.

In an illustrative embodiment, the one or more services may include a messaging service. For example, the first device 102 and the second device 104 may use the messaging service to initiate a chat room or instant messaging session via the D2D communication link 160. Additionally or alternatively, the messaging service may enable the first device 102 and the second device 104 to exchange text messages via the D2D communication link 160.

In an illustrative embodiment, the one or more services may include a file sharing service that enables the first device 102 to access one or more files (e.g., documents, images, music, etc.) stored at the second device 104, and/or vice versa, via the D2D communication link 160.

In an illustrative embodiment, the one or more services may include a synchronization service that enables the first device 102 and the second device 104 to perform a synchronization operation, such as synchronizing first data and/or first applications stored at the first device 102 with second data and/or second applications stored at the second device 104. For example, the first device 102 may store a library of files (e.g., a music library) and the second device 104 may be a personal computing device (e.g., a laptop) that also stores the library of files. When new files are added to the library of files stored on one of the devices 102 or 104, the synchronization service may cause the new files to be sent via the D2D communication link 160 for addition to the library of files stored on the other of the devices 102 or 104.

In an illustrative embodiment, the one or more services may include a connection sharing service. The connection sharing service may enable the second device 104 to share a network connection (e.g., an internet connection of the second device 104) with the first device 102 via the D2D communication link 160. The first device 102 may transmit and/or receive data from a remote device (e.g., a remote web server or an email server) via the D2D communication link 160 using the network connection provided by the connection sharing service. Thus, the connection sharing service may enable the second device 104 to function as a soft access point and to provide other devices, such as the first device 102, access to the network connection using a D2D communication link, such as the D2D communication link 160.

The D2D connection server 110 may receive the discovery request 170 from the first device 102 via the non-D2D communication link 130. In response to receiving the discovery request 170, the D2D connection server 110 may perform operations associated with device discovery, such as operations that would otherwise be performed by the first device 102, to identify one or more candidate neighbor devices.

In an illustrative embodiment, the D2D connection server 110 may store device information 112 at a memory (e.g., a hard disk drive, a random access memory (RAM), a flash memory, etc.) of the D2D connection server 110, and the server-assisted discovery operations may include identifying the one or more candidate neighbor devices based on a comparison of information (e.g., a requested service) included in the discovery request message 170 and the device information 112.

To illustrate, the device information 112 may include a record for each of a plurality of devices. For example, the device information 112 may include a first record corresponding to the first device 102 and may include a second record corresponding to the second device 104. The records (e.g., the first record and the second record) may include data associated with a location of a corresponding device, a capability of the corresponding device, scanning parameters of the corresponding device, and services that may be provided by the corresponding device. The capability of a particular corresponding device may identify one or more wireless communication protocols that may be used to establish a D2D link with the particular corresponding device. For example, the second record may include information that indicates the second device 104 is operable to establish a D2D link (e.g., the D2D link 160) using an 802.11(n) protocol, an 802.11(ah) protocol, or both.

The scanning parameters may indicate a channel identifier, a wakeup time window schedule, and a beacon transmit schedule of a corresponding device. For example, the second record may include scanning parameter information associated with the second device 104. The scanning parameter information may include a channel identifier (ID), a wakeup time window schedule, and/or a beacon transmit schedule (e.g., a time interval between beacon transmissions). The channel identifier may identify a transmission channel that is used by the second device 104 to transmit beacons and/or listen to probe requests or beacons. The wakeup time window schedule may indicate a frequency at which the second device 104 exits a standby or power-save mode and listens for signals (e.g., probe requests or beacons) transmitted by other devices.

In an illustrative embodiment, the device information 112 may be generated and updated based on device information messages transmitted to the D2D connection server 110 from the corresponding devices (e.g., the first device 102 and the second device 104) using a non-D2D link (e.g., one or more of the non-D2D links 130, 140, 150). For example, the first device 102 and the second device 104 may execute a software application that is configured to generate and manage the device information messages. The application may identify and initiate transmission of device information to the D2D connection server 110. The application may also identify and initiate transmission of updated device information periodically or in response to changes in the device information (e.g., a change in device location). In an illustrative embodiment, the device information management application may be provided by a hardware manufacturer, a mobile device seller, a mobile operating system developer, a mobile software application developer, a mobile wireless service provider, etc.

Thus, the discovery request 170 may identify a location of the first device 102, a desired proximity, and one or more desired services. Alternately, the location of the first device 102 may be available in the device information 112 stored at the D2D connection server 110. The D2D connection server 110 may identify one or more candidate neighbor devices in response to the discovery request 170, where the one or more candidate neighbor devices provide the one or more desired services and are within the desired proximity of the first device 102. For example, the one or more candidate neighbor devices may include the second device 104.

In alternate embodiments, instead of using the stored device information 112, the D2D connection server 110 may identify candidate neighbor devices based on communication with access points (e.g., the access point 120). For example, the device information 112 may not be stored at the D2D connection server 110 and instead may be stored as device information 122 at the access point 120. In this embodiment, the D2D connection server 110 may receive the discovery request message 170 from the first device 102 and may send a discovery request message 180 to the access point 120. The discovery request message 180 may request that the access point 120 identify candidate neighbor devices that satisfy constraints or criteria included in the discovery request message 180. In a particular embodiment, the D2D connection server 110 may maintain or have access to a database of access points and locations of such access points, and the D2D connection server 110 may identify the access point 120 by querying the database using the location of the first device 102. The discovery request message 180 may include the location of the first device 102, the desired proximity, and the desired service(s). The access point 120 may identify one or more candidate devices using the device information 122. In a particular embodiment, a device may refrain from uploading device information and may send an unavailability indicator to the D2D connection server 110 and/or the access point 120 when the device is traveling at speeds exceeding a speed threshold (e.g., ten miles per hour) or a battery life is below a battery threshold, because such fast-moving or low-battery devices may not be well-suited to D2D communication. After receiving the unavailability indicator, the D2D connection server 110 may not consider the device in future D2D discovery. The device may send an availability indicator once its speed becomes lower than the speed threshold or battery life becomes sufficient (e.g., exceeds the battery threshold). The D2D connection server 110 may reconsider the device for future D2D discovery after receiving the availability indicator.

Thus, devices (e.g., the first device 102 and the second device 104) may send device information to the access point 120 instead of (or in addition to) the D2D connection server 110. The access point 120 may send information identifying candidate neighbor devices to the D2D connection server 110 as a discovery response 182, and the D2D connection server 110 may send a device list 172 to the first device 102 based on the information included in the discovery response 182. The first device 102 may then select a candidate neighbor device with which the D2D connection server 110 is to initiate permission verification and link setup.

In yet another embodiment, neither the D2D connection server 110 nor the access point 120 stores device information. For example, the D2D connection server 110 may receive the discovery request 170 from the first device 102 and send the discovery request 180 to the access point 120. The discovery request 180 may request that the access point 120 identify candidate neighbor devices that are within a threshold distance of the first device 102 and that are operable to provide a requested service (e.g., a service identified in the discovery request 170). The access point 120 may be communicatively coupled to a plurality of devices and may have a communication range that is greater than the threshold distance. The access point 120 may broadcast a discovery request 190 to each of the plurality of devices within the communication range of the access point 120.

In response to the discovery request 190, the access point 120 may receive a discovery response 192 from each of the plurality of devices. A discovery response 192 received from a particular device of the plurality of devices may include a location of particular device. Based on the discovery response(s) 192, the access point 120 may determine a first set of devices that are within the threshold distance of the first device 102. The access point 120 may then send a service update message to each device in the first set of devices to identify, based on responses to the service update message, a second set of devices that are operable to provide the requested service to the first device 102. The access point 120 may send the discovery response 182 to the D2D connection server 110, where the discovery response 182 identifies the second set of devices. The D2D connection server 110 may receive the discovery response 182 from the access point 120 and may send the device list 172 to the first device 102.

In an alternate embodiment, the discovery request 190 sent from the access point 120 may include a request to identify services accessible at each of the devices within the communication range of the access point 120. In such an embodiment, the corresponding discovery response(s) 192 may include locations of each of the plurality of devices and may identify services accessible at each of the plurality of devices that are within the communication range of the access point 120. In another embodiment, the discovery request 190 may include the location of the first device 102 and may cause devices within range of the access point 120 to respond to the discovery request 190 when the device receiving the discovery request 190 is both within the threshold distance of the first device 102 and operable to provide the requested service to the first device 102 via a D2D communication link. It should be noted that, as described above, devices that are moving at speeds exceeding a speed threshold or have battery power that is lower than a battery threshold may not send a response to the discovery request 190 (or may send an unavailability indicator).

In an illustrative embodiment, the discovery response 182 from the access point 120 to the D2D connection server 110 may include a location of each device that is within the communication range of the access point 120 and that is operable to provide the service(s) requested by the first device 102. The D2D connection server 110 may determine which of the devices identified in the discovery response 182 are within the desired proximity of the first device 102 based on the locations included in the discovery response 182.

In an illustrative embodiment, the device information 112 stored at the D2D connection server 110 may not include location information. In response to receiving the discovery request 170, the D2D connection server 110 may send the discovery request 180 to the access point 120. In this embodiment, the discovery request 180 may request that the access point 120 provide location information to the D2D connection server 110 for each device within the communication range of the access point 120. In an illustrative embodiment, the discovery request 180 includes the threshold distance and the location of the first device 102 and may request that the access point 120 provide location information for each device that is both within the communication range of the access point 120 and within the threshold distance of the first device 102. The access point 120 may determine the locations of neighbor devices based on information (e.g., the device information 122) stored at the access point 120 or may dynamically determine the locations (e.g., using the discovery request 190). By not storing frequently changing information (e.g., location information) in the device information 112, network traffic may be reduced, because devices may only send update messages to the D2D communication server 110 when an infrequently changing parameter (e.g., scanning parameters, capabilities, services, whitelist information, etc.) is updated.

Similarly, in an illustrative embodiment, the device information 122 stored at the access point 120 may not include information associated with the locations of the plurality of devices. In response to receiving the discovery request 180 from the D2D connection server 110, the access point 120 may dynamically determine the locations of neighbor devices (e.g., using the discovery request 190). To illustrate, upon receiving the discovery request 180, the access point 120 may first determine, based on the device information 122, a set of neighbor devices that are in communication with the access point 120 and that satisfy a criteria (e.g., can provide the service(s) requested by the first device 102). The access point 120 may then query each device in the set of neighbor devices for location information, and determine which of the candidate neighbor devices are within the requested proximity to the first device 102. By not storing frequently changing information (e.g., location information) in the device information 122, network traffic may be reduced, because devices may only send update messages to the access point 120 when an infrequently changing parameter (e.g., scanning parameters, capabilities, services, whitelist information, etc.) is updated.

Regardless of whether candidate neighbor devices are identified solely by the D2D connection server 110 based on the device information 112 or based on communication with the access point 120, the D2D connection server 110 may respond to the discovery request 170 by sending a discovery response to the first device 102. The discovery response may include information (e.g., the device list 172) that identifies each of the one or more candidate neighbor devices. The first device 102 may receive the discovery response from the D2D connection server 110 via the non-D2D communication link 130. In an illustrative embodiment, the first device 102 may be configured to present (e.g., display) a list corresponding of the one or more candidate neighbor devices. A user of the first device 102 may select a particular candidate neighbor device from the list by providing an input to the first device 102 via (e.g., via a keypad, a touchscreen, etc.). The first device 102 may send a message to the D2D connection server 110 identifying the selected candidate neighbor device, thereby concluding D2D discovery.

Node-Assisted (e.g., Server-Assisted) D2D Permission Verification

After D2D discovery is concluded, the D2D connection server 110 may initiate permission verification operations. Permission verification may include verifying that the first device 102 and the selected candidate neighbor device (e.g., the second device 104) desire to initiate a D2D communication link with each other. In an illustrative embodiment, the D2D connection server 110 may send a first permission request to the first device 102 via the non-D2D communication link 130 and may send a second permission request to the second device 104 via the non-D2D links 140 and 150. In another embodiment, the D2D connection server 110 may send the second permission request to the second device 104 via a non-D2D communication link (e.g., a cellular communication link) that is not routed through the access point 120. In an illustrative embodiment, when multiple candidate neighbor devices exist, the D2D connection server 110 may send a list of candidate neighbor devices in a single request message to the first device 102 for permission verification. In the message, the D2D connection server 110 may also request the first device 102 to indicate connection priority for each permitted neighbor device. In parallel, the D2D connection server may send a permission request to each candidate neighbor device for permission verification.

The first device 102 may send a first permission response to the D2D connection server 110 and the second device 104 may send a second permission response to the D2D connection server 110. When the first permission response and the second permission response grant permission to establish a D2D communication link between the first device 102 and the second device 104, the D2D connection server 110 may conclude permission verification and may initiate link setup operations to establish the D2D communication link 160 between the first device 102 and the second device 104. When at least one of the first permission response and the second permission response denies permission to establish the D2D communication link 160, the D2D connection server 110 may send message(s) indicating that permission has been denied. In an illustrative embodiment, when multiple candidate neighbor devices exist, the first device 102 may indicate all permitted neighbor devices in a single response message, along with connection priorities for each of the permitted neighbor devices. Upon receiving the permission request from the D2D connection server, each candidate neighbor device will also send a permission response. After receiving all permission responses, the D2D connection server 110 may automatically initiate D2D link setup between the first device and each candidate neighbor device with mutual permissions based on the connection priorities indicated by the first device. Alternately, the D2D connection server 110 may automatically determine the relative priority of each candidate neighbor device based on the distance between the candidate neighbor device and the first device 102. After receiving all permission responses, the D2D connection server 110 may initiate D2D link setup between the first device and each candidate neighbor device with mutual permissions based on the connection priorities determined by the D2D connection server 110.

In some embodiments, one or more permission verification operations may be skipped or implied. For example, the discovery request 190 may represent an implicit permission request and the discovery response 192 may implicitly indicate that the responding device (e.g., the second device 104) is granting permission regarding establishment of the D2D communication link 160 with the first device 102. In this embodiment, the D2D connection server 110 may not perform the permission verification with respect to the second device 104 and may only send a permission request to the first device 102.

As another example, the D2D connection server 110 may store whitelist information 114 for devices. The whitelist information 114 may identify "trusted" devices for each device. When device B appears on the whitelist of device A, the D2D connection server 110 may skip sending a permission request to device A regarding device B. Thus, when each of the devices 102, 104 appears on the other device's whitelist information 114, the D2D connection server 110 may skip permission verification and automatically initiate link setup.

In an illustrative embodiment, the D2D connection server 110 may generate and/or update the whitelist information 114 based on permission responses received from devices. For example, the D2D connection server 110 may send permission requests to the first device 102 and/or the second device 104 and receive permission responses from the first device 102 and/or the second device 104. The permission responses may be used to generate and/or update the whitelist information 114. To illustrate, if the permission response received from the first device 102 grants permission to establish a D2D communication link with the second device 104, the D2D connection server 110 may add the second device 104 to a whitelist of first device 102. Similarly, if the permission response received from the second device 104 grants permission to establish a D2D communication link with the first device 102, the D2D connection server 110 may add the first device 102 to a whitelist of the second device 104.

It should be noted that the description of whitelist information 114 is provided for illustration only. In an alternate embodiment, the D2D connection server 110 may maintain and use blacklist information instead of (or in addition to) the whitelist information 114 and may use the blacklist information when performing permission verification.

In an illustrative embodiment, the D2D connection server 110 may interpret user selection of the second device 104 as implying that the first device 102 is granting permission to connect to the second device 104. Thus, when the second device 104 is manually selected at the first device 102, the D2D connection server 110 may skip sending a permission request to the first device 102.

Node-Assisted (e.g., Server-Assisted) D2D Link Setup

Upon completion of permission verification, the D2D connection server 110 may initiate link setup operations to establish the D2D communication link 160. For example, the D2D connection server may send first scanning information to the first device 102 and may send second scanning information to the second device 104. The first scanning information may be used by the first device 102 to determine when and how to perform D2D scanning to locate and connect to the second device 104, and the second scanning information may be used by the second device 104 to determine when and how to perform D2D scanning to locate and connect to the first device 102. To facilitate the D2D scanning, the scanning information (e.g., the first scanning information and the second scanning information) sent by the D2D connection server 110 may include scanning parameters (e.g., channel ID, wakeup schedule, beacon transmission schedule, etc.).

In addition to sending scanning information, the D2D connection server 110 may send D2D link setup information including a first credential to the first device 102 and/or a second credential to the second device 104. In an illustrative embodiment, D2D link setup information may include information that designates the first device 102 or the second device 104 as a Wi-Fi Direct group owner (e.g., a "virtual access point" or a "master device"). For example, the D2D connection server 110 may determine whether to designate the first device 102 or the second device 104 as the group owner based on a group owner preference value included in the device information 112. When one of the devices 102 or 104 indicates a preference to serve as a group owner but the other device does not indicate such a preference, the D2D connection server 110 may select the preferred device as the group owner. However, when both or neither of the devices 102 or 104 indicates a group owner preference, the D2D connection server 110 may select a group owner randomly or by some other method.

In an illustrative embodiment, the group owner device may send credential information to the D2D connection server 110 and the D2D connection server 110 may forward the credential information to the non-group owner device. The D2D connection server 110 may also store a device's credential in advance, so the device does not need to send its credential during D2D link setup. In an illustrative embodiment, the device information 112 may include credential information for each of a plurality of managed devices and the D2D connection server 110 may send the group owner device's credential information to the non-group owner device. In an illustrative embodiment, the D2D connection server 110 may also send credential information associated with the non-group owner device to the group owner device. The credential information may include a private key/public key pair, a pre-shared key (PSK), a shared secret, and/or a certificate that may be used to generate an encryption key, where the encryption key is used to encrypt data transmitted between the first device 102 and the second device 104 via the D2D communication link 160. In an illustrative embodiment, the D2D connection server 110 may generate and/or send the same credential (e.g., a common credential) to all managed devices (e.g., including the first device 102 and the second device 104) in advance, so that a separate credential distribution step is not needed each time a D2D communication link is established. The D2D connection server 110 may also periodically send an updated common credential to each of the plurality of managed devices. By distributing credential information via non-D2D links, the D2D connection server 110 may enable skipping of a more time-consuming and power-intensive credential distribution process between devices via a D2D link once the D2D link is established. Alternatively, the D2D connection server 110 may generate a distinct credential for both group owner and non-group owner devices during D2D link setup. Different credentials may be generated for different D2D communication links, which may provide more security than using a common credential across multiple D2D communication links.

In an illustrative embodiment, the D2D connection server 110 may also determine an internet protocol (IP) address for the first device 102 and/or the second device 104. The IP address may be used by the devices 102 and 104 to communicate via the D2D communication link 160. In another embodiment, the IP addresses may be determined by the group owner device and the group owner device may provide the IP addresses to the D2D connection server 110. The D2D connection server 110 may forward the IP addresses to the non-group owner device via a non-D2D link. In an alternate embodiment, IP address allocation may be performed by the devices 102 and 104 via the D2D communication link 160, after the D2D communication link 160 is established.

Once the D2D communication link 160 is established, the devices (e.g., the first device 102 and the second device 104) may communicate via the D2D communication link 160. For example, when the requested service is a printing service provided by the second device 104, the first device 102 may communicate data to the second device 104 via the D2D communication link 160 for printing. After the D2D communication link 160 is established, the D2D connection server 110 may monitor locations of the first device 102 and the second device 104 to determine whether the first device 102 and the second device 104 are about to move out of D2D communication range. In an illustrative embodiment, the D2D connection server 110 may send a message to the first device 102, the second device 104, or both when the devices have moved out of, or are about to move out of, communication range. The message may include a location of the devices and an application executing on each device may provide a map displaying the location of the first device 102 and the second device 104. The map may enable a user of the first device 102, a user of the second device 104, or both to move towards the other device in order to re-establish or preserve the D2D communication link 160.

Additionally or alternatively, when the devices 102,104 have moved out of range for communication via the D2D communication link 160, the D2D connection server 110 may monitor the locations of the devices and, if the devices move back within D2D communication range during a time period (e.g., within ten (10) seconds), the D2D connection server 110 may automatically initiate the link setup operations without re-performing discovery or permission verification operations (e.g., a fast reconnection procedure). In an illustrative embodiment, the devices 102,104 may store received scanning information and may reinitiate scanning using the stored scanning information in response to a failure of the D2D communication link 160. If the devices fail to re-establish the D2D communication link 160 before a time period elapses, the first device 102 may send another discovery request message to the D2D connection server 110, and the D2D connection server 110 may initiate the device discovery operations again. In an illustrative embodiment, the D2D connection server 110 may send a second discovery response message that includes the candidate neighbor devices that were identified previously (i.e., the candidate neighbor devices identified in response to receiving the first discovery request 170).

Thus, the system 100 of FIG. 1 may enable node-assisted D2D discovery, permission verification, and link setup (including credential distribution) via non-D2D communication links. By assuming complete or at least partial responsibility for such operations, a network node (e.g., the D2D connection server 110) may reduce power consumption at the first device 102 and the second device 104 during D2D connection setup. Medium congestion and messaging exchanges may also be reduced. For example, providing scanning information to the devices 102 and 104 may enable the devices 102 and 104 to establish the D2D communication link faster and more efficiently. To illustrate, because the devices 102 and 104 are provided scanning information, the devices 102 and 104 may not need to scan all channels during connection setup and may be able to scan for a shorter duration based on wakeup/beacon transmission schedule information. As another example, storing the whitelist information 114 may reduce the amount of permission verification messaging. As yet another example, the D2D connection server 110 may reduce power consumption at the devices 102, 104 by performing credential distribution, group owner assignment, and/or IP address allocation via non-D2D communication links before the D2D communication link is established. The automatic node-assisted D2D connection establishment techniques of FIG. 1 may thus establish D2D connections faster (e.g., in less than 5 seconds) than methods that require manual user intervention (e.g., synchronized button pushes or PIN entry).

Figure 2:
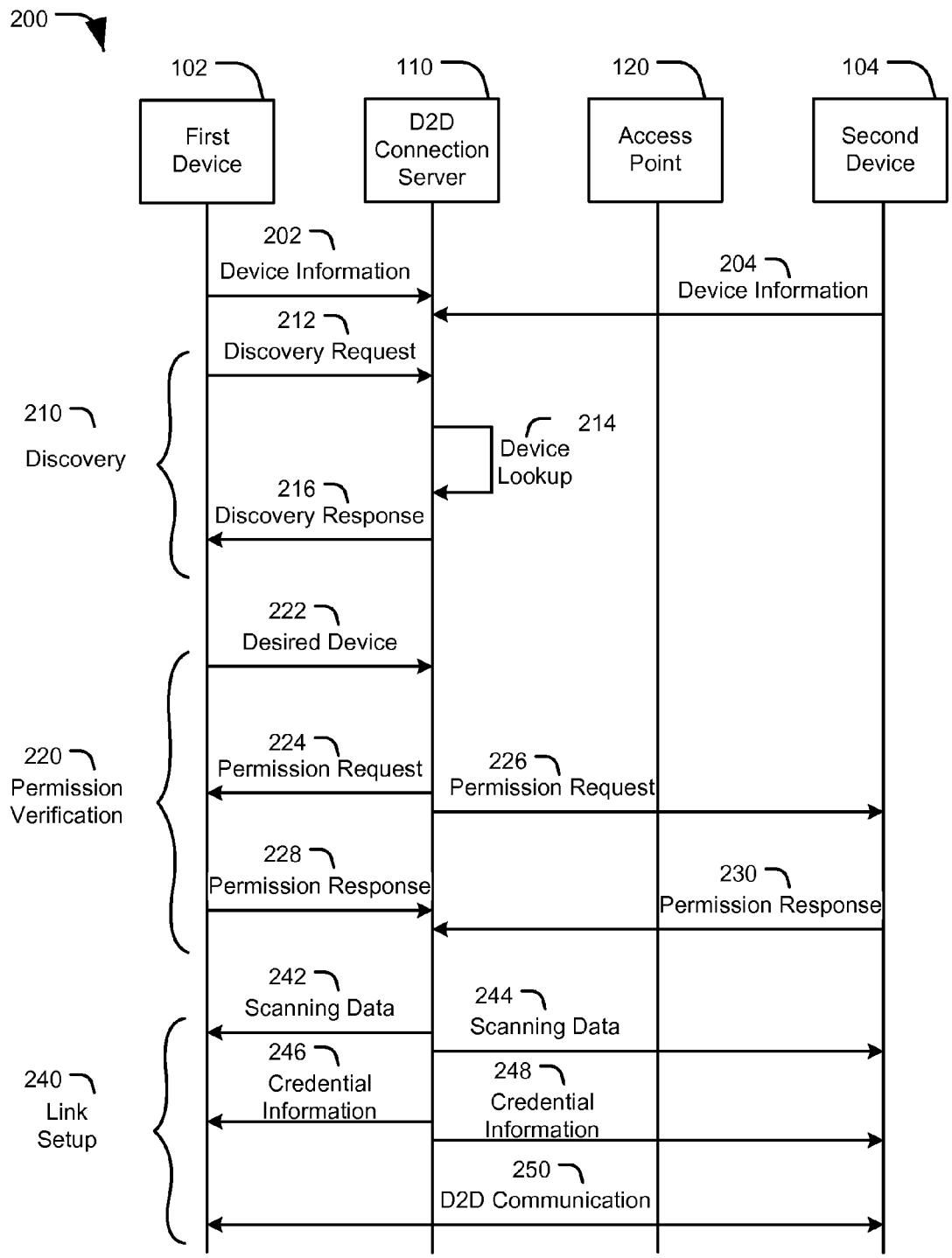
FIG. 2 illustrates a particular embodiment of messaging at the system of FIG. 1.

Referring to FIG. 2, a first illustrative embodiment of message sequencing in a system configured to provide node-assisted device-to-device connections is shown and designated 200. In a particular embodiment, the system 200 may be the system 100 of FIG. 1 and may include the first device 102, the D2D connection server 110, the access point 120, and the second device 104. As shown in FIG. 2, the first device 102 may transmit device information 202 to the D2D connection server 110 and the second device 104 may transmit device information 204 to the D2D connection server 110. The D2D connection server 110 may store the device information 202 and the device information 204 at a device information database (e.g., as the device information 112 of FIG. 1).

The D2D connection server 110 may be configured to facilitate the establishment of a D2D communication link (e.g., the D2D communication link 160 of FIG. 1) between the first device 102 and the second device 104. Facilitating the establishment of a D2D communication link may be broadly divided into three sets of operations—discovery operations 210, permission verification operations 220, and link setup operations 240. For example, the first device 102 may transmit a discovery request message 212 to the D2D connection server 110. In an illustrative embodiment, the discovery request message 212 may be the discovery request message 170 of FIG. 1 and may include the discovery request information described with reference to FIG. 1. For example, the discovery request message 212 may include information that identifies the location of the first device 102, the desired proximity of candidate neighbor devices (e.g., the second device 104) to the first device 102, the one or more desired services to be provided by candidate neighbor devices, or any combination thereof.

The D2D connection server 110 may receive the discovery request 212 and may perform a device lookup 214. The device lookup 214 may include accessing the device information (e.g., the device information 112) stored at the D2D connection server 110 to identify the one or more candidate neighbor devices. After identifying the one or more candidate neighbor devices, the D2D connection server 110 may transmit a discovery response message 216 to the first device 102. In an illustrative embodiment, the discovery response message 216 may include the device list 172 of FIG. 1. The discovery response message 216 may identify one or more candidate neighbor devices, such as the second device 104.

The first device 102 may receive the discovery response message 216 and may transmit a desired device message 222 to the D2D connection server 110. The desired device message 222 may include a request to establish a D2D communication link between the first device 102 and a particular candidate neighbor device of the one or more candidate neighbor devices. For example, the desired device message 222 may include a request to establish a D2D communication link between the first device 102 and the second device 104. In response to receiving the desired device message 222, the D2D connection server 110 may generate a first permission request 224 and a second permission request 226. The D2D connection server 110 may transmit the first permission request 224 to the first device and may transmit the second permission request 226 to the second device 104. The first permission request 224 may be used to verify that the first device 102 grants the second device 104 permission to communicate with the first device 102 via a D2D communication link (e.g., the D2D communication link 160 of FIG. 1), and the second permission request 226 may be used to verify that the second device 104 grants the first device 102 permission to communicate with the second device 104 via the D2D communication link (e.g., the D2D communication link 160 of FIG. 1).

The first device 102 may transmit a first permission response message 228 to the D2D communication server 110. The first permission response message 228 may indicate whether the first device 102 has granted or denied the second device 104 permission to communicate with the first device 102 via the D2D communication link and the second permission response message 230 may indicate whether the second device 104 has granted or denied the first device 102 permission to communicate with the second device 104 via the D2D communication link. In a particular embodiment, to reduce messages, the discovery response 216 can be combined with the permission request 224, and the desired device response 218 can be combined with the permission response 228.

When the first permission response message 228 and the second permission response message 230 grant permission to establish the D2D communication link, the D2D connection server 110 transmits first scanning data 242 to the first device 102 and second scanning data 244 to the second device 104. The first scanning data 242 may include first scanning information corresponding to the second device 104 and the second scanning data 244 may include second scanning information corresponding to the first device 102. In an illustrative embodiment, the first scanning information and the second scanning information may include scanning parameters, such as the scanning parameters described with reference to FIG. 1. The first device 102 and the second device 104 may use the scanning parameters to establish the D2D communication link, as described with reference to FIG. 1.

The D2D connection server 110 may transmit first credential information 246 to the first device 102 and may transmit second credential information 248 to the second device 104. The first credential information 246 and the second credential information 248 each may include information that indicates whether the first device 102 or the second device 104 has been designated as a group owner for the D2D communication link. The D2D connection server 110 may determine the group owner based on group owner preference information stored at the D2D connection server 110 as described with reference to FIG. 1. The first credential information 246 and the second credential information 248 may also include a private key/public key pair, a shared secret, and/or a certificate, as described with reference to FIG. 1. The first device 102 and the second device 104 may establish a D2D communication link 250 after receiving the scanning data (e.g., the scanning data 242, 244) and the credential information (e.g., the credential information 246, 248). The D2D communication link 250 may enable the first device 102 to access a service (e.g., one of the services described with reference to FIG. 1) provided by the second device 104. The first device 102 and the second device 104 may encrypt data communicated via the D2D communication link 250 using encryption keys that are generated based on the credential information 246, 248.

As described with reference to FIG. 1, certain embodiments may involve transmitting fewer or different messages than shown in FIG. 2 during discovery, permission verification, and link setup. Embodiments may also involve performing different operations at the devices 102 or 104, the D2D connection server 110, and/or the access point 120. FIGS. 3-7 illustrate alternate embodiments of message sequencing during discovery, permission verification, and/or link setup. It should be noted that message sequences from various described embodiments may be combined or reordered without departing from scope of the disclosure.

Figure 3:
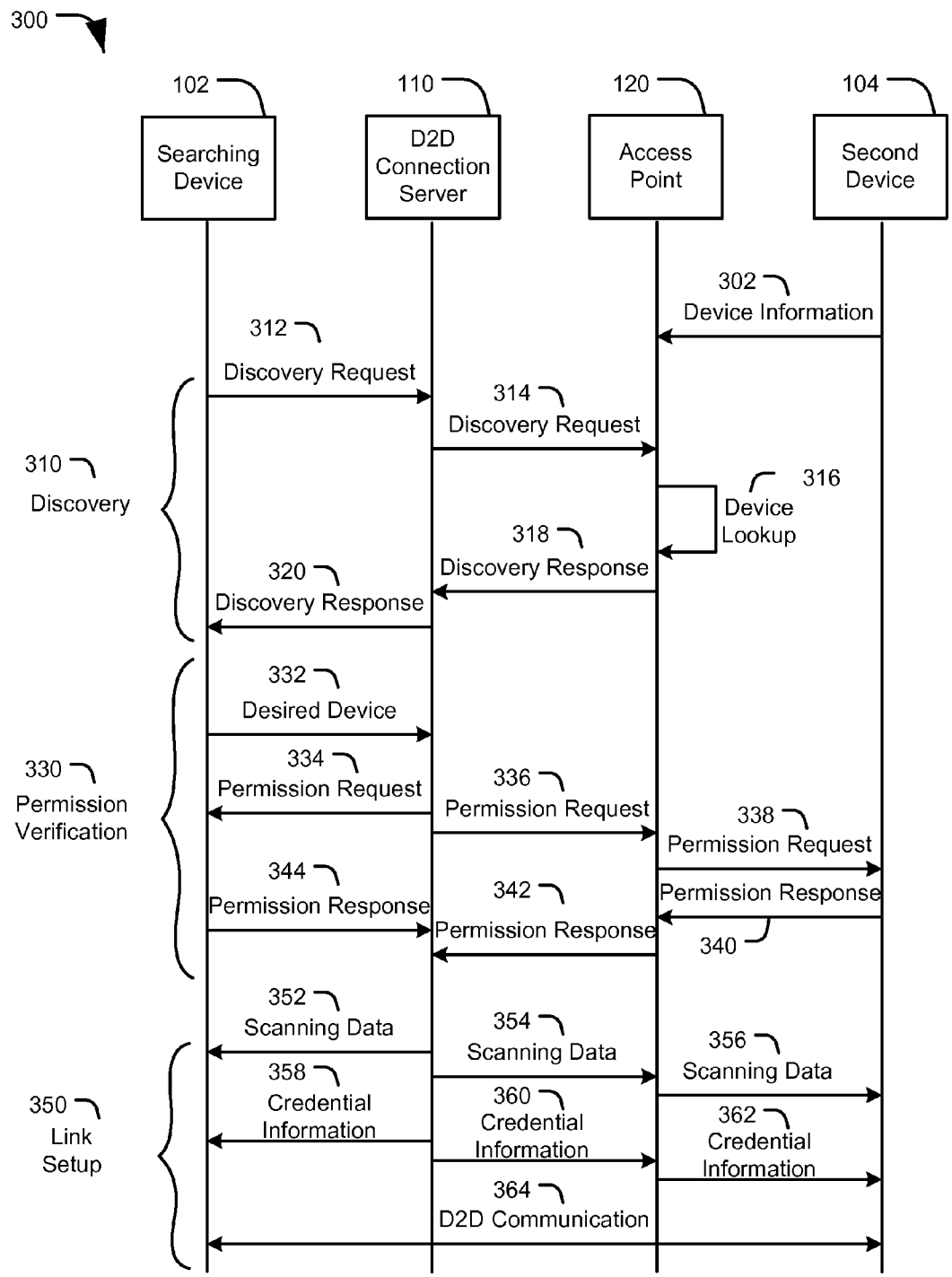
FIG. 3 illustrates another particular embodiment of messaging at the system of FIG. 1.

Referring to FIG. 3, a second illustrative embodiment of message sequencing in a system configured to provide node-assisted device-to-device connections is shown and designated 300. In a particular embodiment, the system 300 may be the system 100 of FIG. 1 and may include the first device 102, the D2D connection server 110, the access point 120, and the second device 104. In contrast to FIG. 2, in FIG. 3 the D2D connection server 110 communicates with the one or more candidate neighbor devices, such as the second device 102, via the access point 120. Additionally, the discovery operations 310 of FIG. 3 differ from the discovery operations 210 of FIG. 2 in that the one or more candidate neighbor devices are determined at the access point 120, rather than the D2D connection server 110. Thus, in FIG. 3, device information is stored at the access point 120.

As shown in FIG. 3, the second device 104 may transmit device information 302 to the access point 120 and the access point 120 may store the device information in a local storage or a database (e.g., as the device information 122 of FIG. 1). In response to receiving a discovery request 312 from the first device 102, the D2D connection server may transmit a discovery request 314 to the access point 120. In an illustrative embodiment, the discovery request 314 may be the discovery request 180 of FIG. 1. The access point 120 may receive the discovery request 314 from the D2D connection server 110 and perform a device lookup 316 to identify one or more candidate neighbor devices that satisfy criteria included in the discovery request 314 (e.g., devices that are within a threshold distance of the first device 102 and that provide a requested service to the first device 102). Thus, the discovery request 314 may be a copy of, or may include similar information as, the discovery request 312.

The access point 120 may transmit a discovery response message 318 to the D2D connection server 110 that identifies the one or more candidate neighbor devices. In an illustrative embodiment, the discovery response message 318 may be the discovery response 182 described with reference to FIG. 1. The D2D connection server 110 may transmit a discovery response message 320 to the first device 102.

During permission verification 330, in response to receiving the discovery response message 320, the first device 102 may identify a selected candidate device, such as the second device 104, and may transmit a desired device message 332 to the D2D connection server 110. The desired device message 332 may indicate that the first device 102 is requesting to establish a D2D communication link with the second device 104. The D2D connection server 110 may transmit a first permission request message 334 to the first device 102 and may transmit a second permission request message 336 to the access point 120. In an illustrative embodiment, the D2D connection server 110 may send a single permission request identifying all candidate neighbor devices and the first device 102 may reply with a single permission response identifying and optionally prioritizing the following D2D link setup order for all permitted neighbor devices. The access point 120 may transmit a third permission request message 338 (e.g., by forwarding the second permission request message 336) to the second device 104.

The first device 102 may transmit a first permission response message 344 to the D2D connection server 110. The second device 104 may transmit a second permission response message 340 to the access point 120 and the access point 120 may transmit a third permission response 342 to the D2D connection server 110. When the first device 102 and the second device 104 grant permission to establish the D2D communication link, the D2D connection server 110 may initiate link setup operations 350. The link setup operations 350 of FIG. 3 differ from the link setup operations 240 of FIG. 2 in that a scanning data message 354 and credential information 360 are transmitted to the access point 120 rather than directly to the second device 104. The access point 120 transmits a scanning data message 356 and credential information 362 to the second device 104. The first device 102 and the second device 104 may initiate a D2D communication link 364 using the scanning data messages 352, 356 and the credential information 358, 362.

Figure 4:
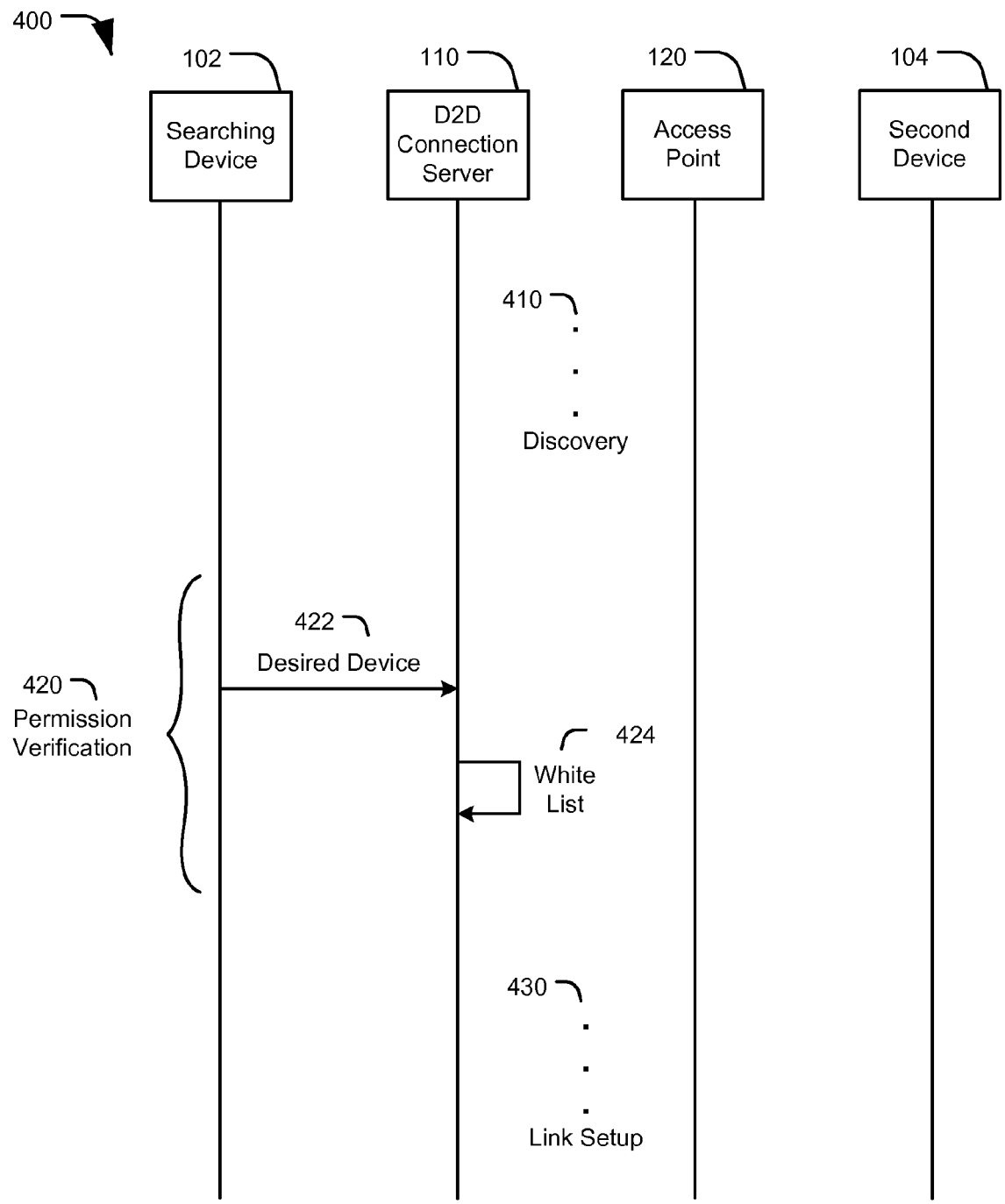
FIG. 4 illustrates another particular embodiment of messaging at the system of FIG. 1.

Referring to FIG. 4, a third illustrative embodiment of a message sequence in a system configured to provide node-assisted device-to-device connections is shown and designated 400. In a particular embodiment, the system 400 may be the system 100 of FIG. 1 and may include the first device 102, the D2D connection server 110, the access point 120, and the second device 104. As shown in FIG. 4, the system 400 may perform discovery operations 410, which may correspond to one or more discovery operations described with reference to FIGS. 1-3 and 5-7.

After the discovery operations 410 have been performed (i.e., one or more candidate neighbor devices have been identified), the first device 102 may transmit a desired device message 422 to the D2D connection server 110. The desired device message 422 may include a request to establish a D2D communication link between the first device 102 and a particular candidate neighbor device of the one or more candidate neighbor devices. For example, the desired device message 422 may include a request to establish a D2D communication link between the first device 102 and the second device 104.

The D2D connection server 110 may perform permission verification operations 420 using whitelist information (e.g., the whitelist information 114 of FIG. 1), as shown at 424. For example, the D2D connection server 110 may store first whitelist information corresponding to the first device 102 and second whitelist information corresponding to the second device 104. The first whitelist information may identify "trusted" devices that have been granted permission by the first device 102 to establish a D2D communication link with the first device 102. The second whitelist information may identify "trusted" devices that have been granted permission by the second device 104 to establish a D2D communication link with the second device 104. The D2D connection server 110 may determine whether the first device 102 is included in the second whitelist information and may determine whether the second device 104 is included in the first whitelist information. When the devices 102, 104 are included in each other's whitelists, the D2D connection server may initiate link setup operations 430 without transmitting permission requests to the first device 102 and the second device 104. In an illustrative embodiment, the link setup operations 430 may correspond to one or more link setup operations described with reference to FIGS. 1-3 and 5-7.

Figure 5:
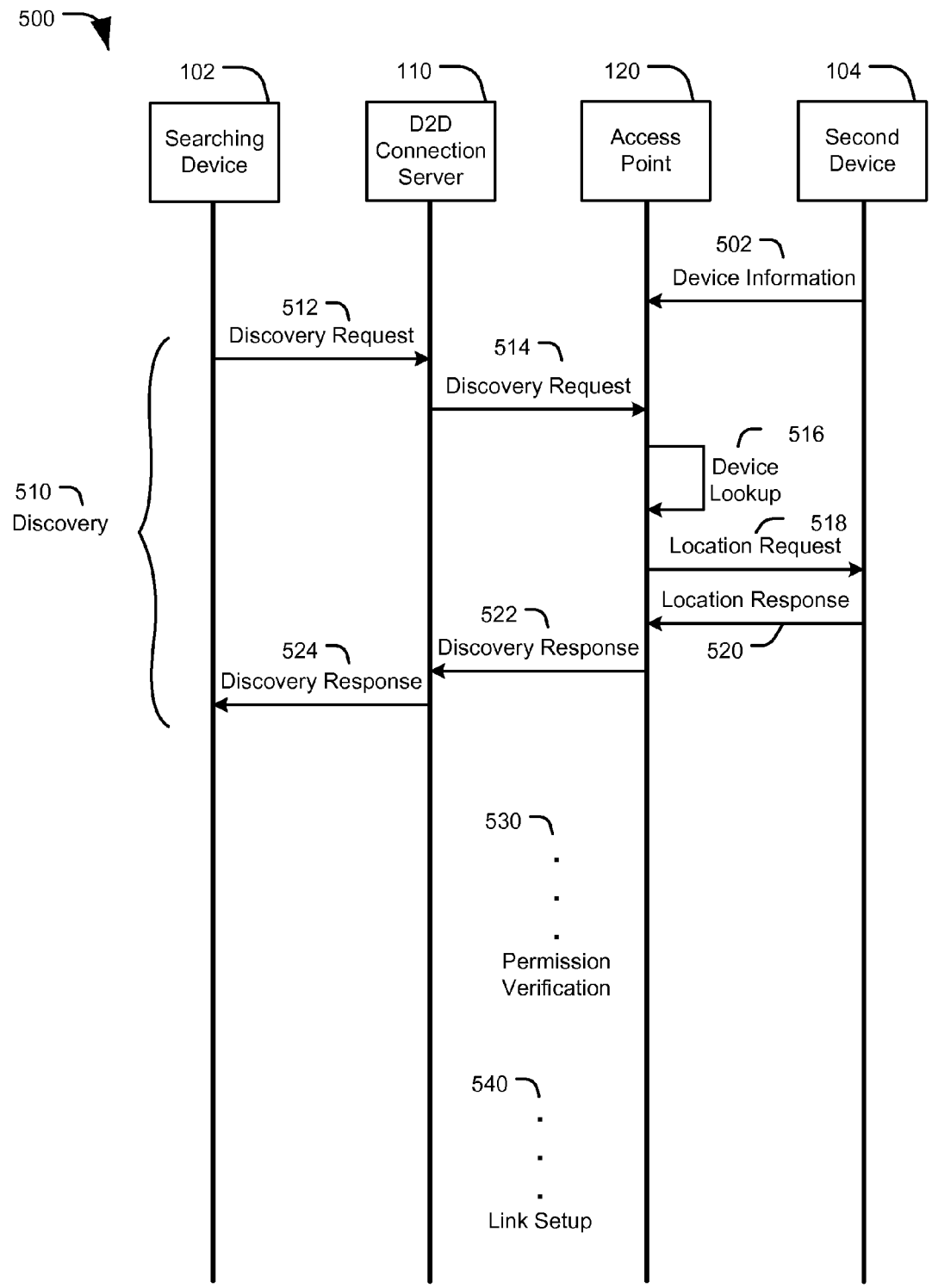
FIG. 5 illustrates another particular embodiment of messaging at the system of FIG. 1.

Referring to FIG. 5, a fourth illustrative embodiment of a message sequence in a system configured to provide node-assisted device-to-device connections is shown and designated 500. In a particular embodiment, the system 500 may be the system 100 of FIG. 1 and may include the first device 102, the D2D connection server 110, the access point 120, and the second device 104. As shown in FIG. 5, the second device 104 may transmit device information 502 to the access point 120. The device information 502 may include one or more services provided by the second device 104, a capability of the second device 104, scanning parameters of the second device 104, a group owner preference value associated with the second device 104, and/or credential information of the second device 104. In FIG. 5, the device information message 502 may not include frequently changing information, such as information associated with a location of the second device 104.

The D2D connection server 110 may initiate device discovery operations 510 in response to receiving a discovery request 512 from the first device 510. As shown in FIG. 5, the device discovery operations 510 are similar to the discovery operations 310 of FIG. 3. However, the device discovery operations 510 differ from the device discovery operations 310 of FIG. 3 in that the access point 120 transmits a location request 518 to the second device 104 in response to performing a device lookup 516. To illustrate, the access point 120 may perform the device lookup 516 to identify a first set of candidate neighbor devices that are operable to provide a requested service (i.e., a service requested by the first device 102 in the discovery request 514). Because the device information stored at the access point 120 does not include location information, the access point 120 may transmit a location request 518 to each of the first set of candidate neighbor devices to identify a second set of candidate neighbor devices. The second device 104 may transmit a location response 520 in response to the location request 518. In an illustrative embodiment, a candidate neighbor device may not respond if the first device 102 is not within the candidate neighbor device's threshold distance (e.g., communication range) or if the candidate neighbor device is not in the first device's threshold distance. The access point 120 may identify candidate neighbor devices that are within a threshold distance (i.e., within a D2D communication range) of the first device 102 and transmit a discovery response 522 to the D2D connection server 110. The D2D connection server 110 may transmit a discovery response 524 to the first device 102 identifying the candidate neighbor devices.

After performing the device discovery operations 510, the system 500 may perform permission verification operations 530 and link setup operations 540 to establish a D2D communication link between the first device 102 and the second device 104. In an illustrative embodiment, the permission verification operations 530 may correspond to one or more permission verifications operations described with reference to FIGS. 1-4, 6, and 7. In an illustrative embodiment, the link setup operations 540 may correspond to one or more link setup operations described with reference to FIGS. 1-4, 6, and 7.

Figure 6:
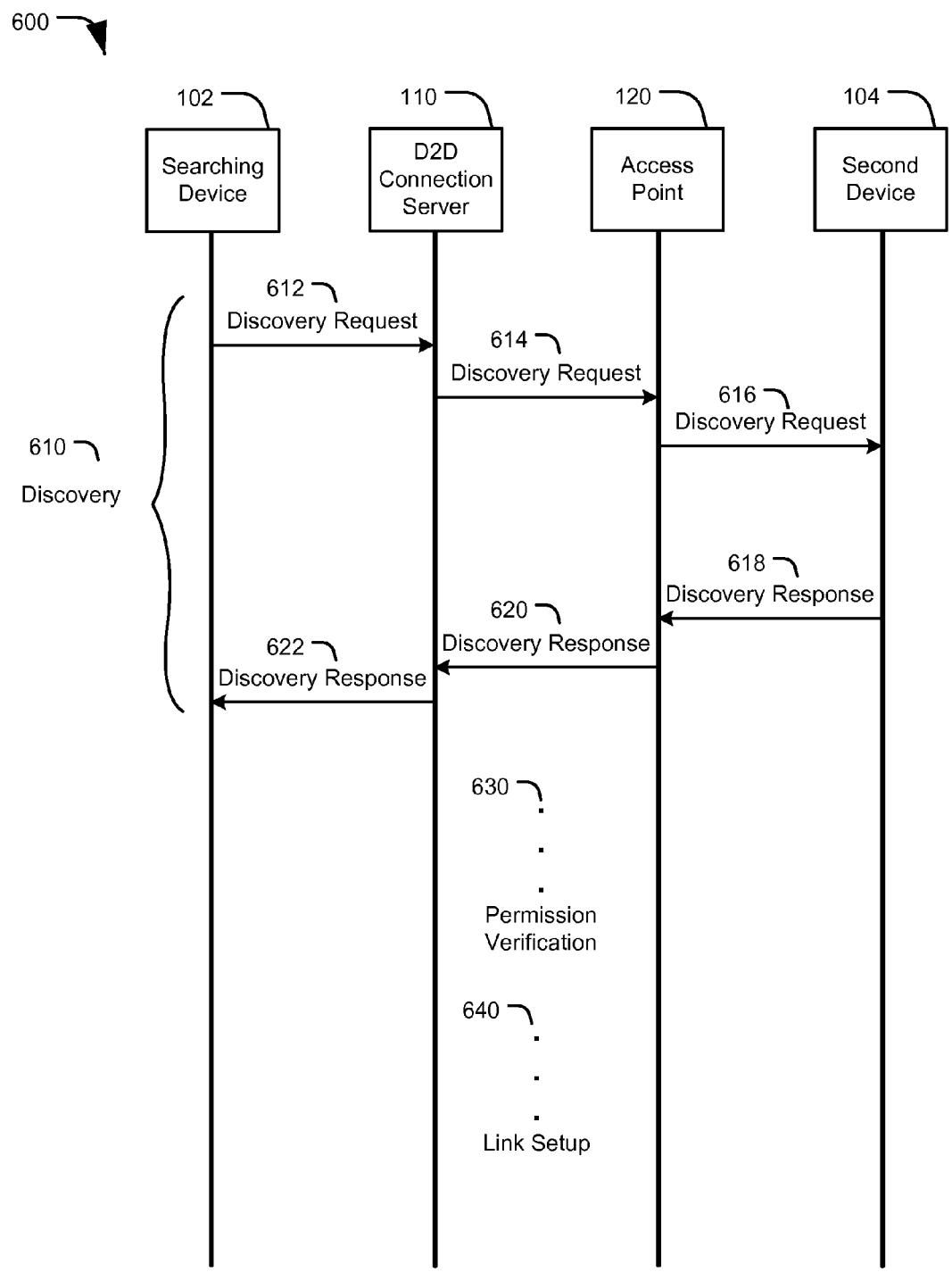
FIG. 6 illustrates another particular embodiment of messaging at the system of FIG. 1.

Referring to FIG. 6, a fifth illustrative embodiment of a message sequence in a system configured to provide node-assisted device-to-device connections is shown and designated 600. In a particular embodiment, the system 600 may be the system 100 of FIG. 1 and may include the first device 102, the D2D connection server 110, the access point 120, and the second device 104. As shown in FIG. 6 the system 600 may initiate discovery operations 610 when the first device 102 transmits a discovery request 612 to the D2D connection server 110. In an illustrative embodiment, the discovery request 612 may be the discovery request 170 of FIG. 1. In the system 600, the D2D connection server 110 and the access point 120 may not store device information (e.g., the device information 112 or the device information 122 of FIG. 1). When the D2D connection server receives the discovery request 612, the D2D connection server 110 may transmit a discovery request 614 to the access point 120.

The access point 120 may broadcast a discovery request message to each device within a communication range of the access point 120. For example, the access point 120 may transmit a discovery request message 616 that is received by the second device 104. The second device 104 may transmit a discovery response message 618 to the access point 120. It should be noted that candidate neighbor devices may selectively respond to the discovery request 616 based on various conditions. For example, a candidate neighbor device may respond when the candidate neighbor device is available (e.g., previously sent an availability indicator), but may not respond (or may not be considered for D2D discovery) when the candidate neighbor device is unavailable. The candidate neighbor device may be available when the candidate neighbor device is travelling at a speed that is less than a speed threshold and when the candidate neighbor device has battery power that is greater than a battery threshold. The candidate neighbor device may be unavailable when either of the aforementioned conditions is false. Additionally, an otherwise available candidate neighbor device may refrain from responding when the candidate neighbor device is outside the threshold distance of the first device 102 or when the first device 102 is outside the threshold distance of the candidate neighbor device. Furthermore, an otherwise available candidate neighbor device may refrain from responding when it does not provide any service requested by the first device 102 or the first device 102 is not in its whitelist. The discovery response message 618 may include device information associated with the second device 104. For example, the device information may include information that identifies one or more services provided by the second device 104, a capability of the second device 104, scanning parameters of the second device 104, a group owner preference value associated with the second device 104, credential information of the second device 104, and/or a location of the second device 104. In response to receiving the discovery response 618, the access point 120 may transmit a discovery response 620 to the D2D connection server 110.

In an illustrative embodiment, the access point 120 may receive discovery responses from a plurality of devices and may determine, based on the location information received from each of the devices, whether each of the plurality of devices are within a threshold distance (e.g., the threshold distance included in the discovery request 612) of the first device 102. Additionally, the access point 120 may determine which of the devices that are within the threshold distance of the first device 102 are operable to provide the requested service (e.g., the service requested in the discovery request 612) to the first device 102. The discovery response 620 may include device information that identifies one or more candidate neighbor devices that are within the threshold distance of the first devices 102 and that are operable to provide the requested service to the first device 102. In this embodiment, the D2D connection server 110 may transmit the discovery response 622 to the first device 102. The discovery response 622 may include the information that identifies the one or more candidate neighbor devices. In another embodiment, the discovery response 620 may include the device information received from each of the plurality of devices and the D2D connection server 110 may determine the one or more candidate neighbor devices.

After completing the discovery operations 610, the system 600 may perform permission verification operations 630 and link setup operations 640 to establish the D2D communication link between the first device 102 and the second device 104. In an illustrative embodiment, the permission verification operations 630 may correspond to one or more permission verifications operations described with reference to FIGS. 1-5 and 7. In an illustrative embodiment, the link setup operations 640 may correspond to one or more permission verifications operations described with reference to FIGS. 1-5 and 7.

Figure 7:
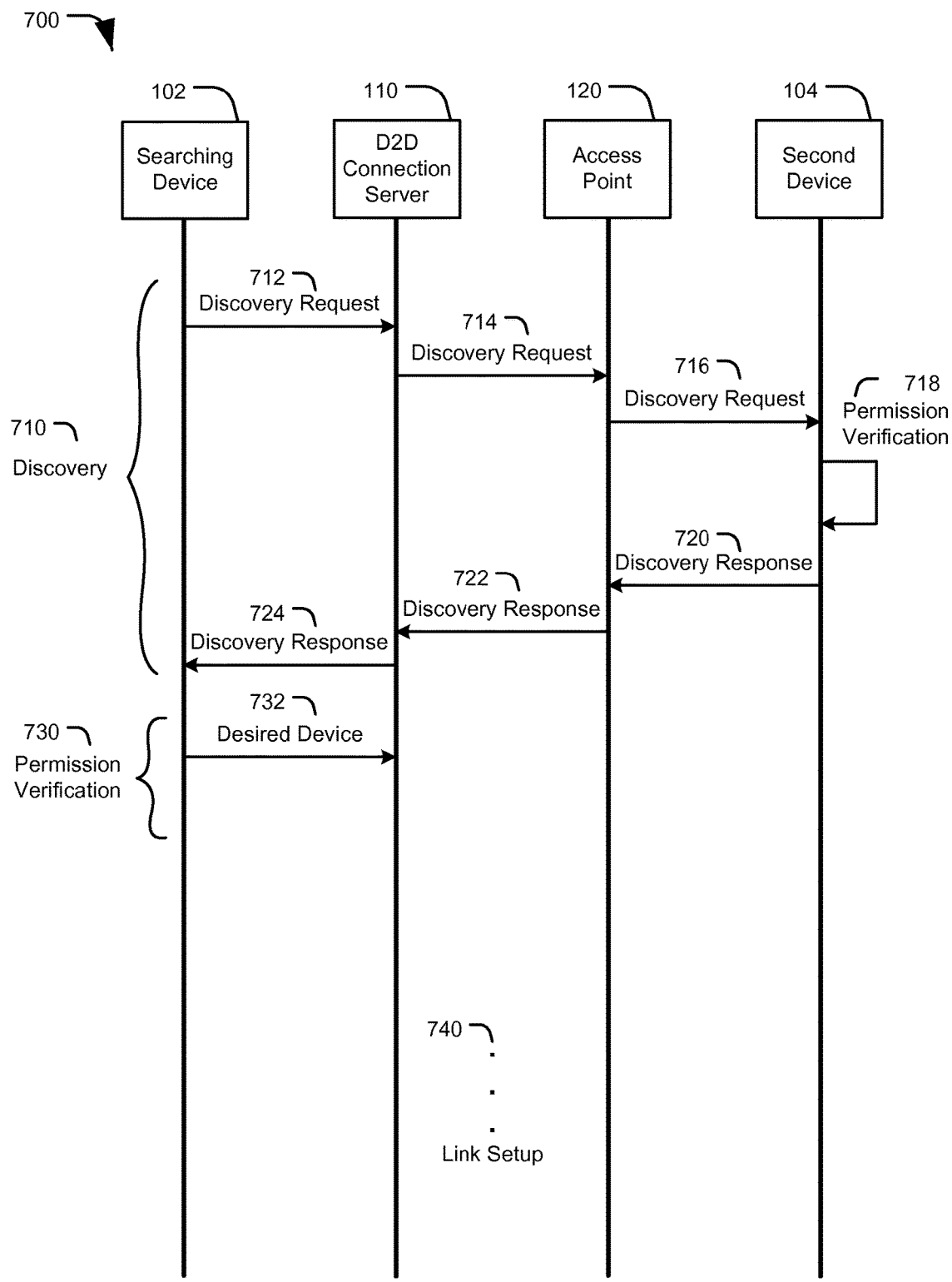
FIG. 7 illustrates another particular embodiment of messaging at the system of FIG. 1.

Referring to FIG. 7, a sixth illustrative embodiment of a message sequence in a system configured to provide node-assisted device-to-device connections is shown and designated 700. In a particular embodiment, the system may be the system 100 of FIG. 1 and may include the first device 102, the D2D connection server 110, the access point 120, and the second device 104. As shown in FIG. 7, the system 700 may initiate discovery operations 710 when the first device 102 transmits a discovery request 712 to the D2D connection server 110, which may in turn transmit a discovery request 714 to the access point 120. The discovery operations 710 are similar to the discovery operations 610 of FIG. 6, except that devices within the communication range of the access point 120 perform permission verification prior to transmitting the discovery response. For example, the second device 104 may receive the discovery request 716 from the access point 120 (which includes data about the first device 102), treat the discovery request 716 as an implicit permission request, and perform permission verification operation(s) 718 prior to transmitting the discovery response 720. For example, the permission verification operation(s) 718 may include generating and displaying a permission request at the second device 104 and receiving a permission response via user input. Alternately, the permission verification operation(s) may include determining whether the first device 102 is included in a whitelist stored at the second device 104. Thus, the discovery response 720 may include information indicating whether the second device 104 has granted or denied permission to establish a D2D communication link between the first device 102 and the second device 104. Alternately, the discovery response 720 may only be transmitted if permission is granted.

The first device 102 may receive the discovery response 724 from the D2D connection server 110. The discovery response 724 (which may be generated based on a discovery response 722 from the access point 120) may identify one or more candidate neighbor devices that have granted permission to establish the D2D communication link with the first device 102 and that are operable to provide the requested service to the first device 102 via the D2D communication link. The first device 102 may transmit a desired device message 732 to the D2D connection server 110. The desired device message 732 may indicate that the first device 102 is requesting to establish a D2D communication link with a particular candidate neighbor device (e.g., the second device 104) and may also include information that indicates that the first device 102 has granted permission to establish the D2D communication link between the first device 102 and the particular candidate neighbor device.

In response to receiving the desired device message 732, the D2D connection server 110 may initiate link setup operations 740. In an illustrative embodiment, the link setup operations 740 may correspond to one or more link setup operations described with reference to FIGS. 1-6.

By including the permission verification within the discovery response message 720 and within the desired device message 732, network traffic may be reduced during the permission verification stage 730. Additionally, the inclusion of the permission verification within the discovery response message 720 and within the desired device message 732 may enable the D2D communication link to be established in less time due to the elimination of additional messages to perform permission verification.

In a particular embodiment, data formats, packet formats, etc. of one or more of the messages described with reference to FIGS. 1-7 may be standardized. For example, one or more wireless communication standards, such as an IEEE 802.11, Wi-Fi Direct, etc. may be updated to add support for node-assisted D2D connection setup as described herein.

FIG. 8 is a flowchart of an illustrative embodiment of a method 800 of operation at a network node (e.g., the D2D connection server 110 of FIG. 1). The method 800 may include receiving, at a network node, a D2D discovery request (e.g., the discovery request 170 of FIG. 1) from a first device (e.g., the first device 102), at 802. The method 800 may also include sending a D2D discovery response (e.g., including the device list 172) from the network node to the first device, at 804. The D2D discovery response includes information associated with a second device (e.g., the second device 104) that is available to establish a D2D connection (e.g., the D2D communication link 160) with the first device.

FIG. 9 is a flowchart of an illustrative embodiment of a method 900 of operation at the first device 102 of FIG. 1 (e.g., a searching device). The method 900 may include sending a D2D discovery request (e.g., the discovery request 170 of FIG. 1) from a first device (e.g., the first device 102) to a network node, at 902. The method 900 may also include receiving a D2D discovery response (e.g., including the device list 172) at the first device from the network node, at 904. The D2D discovery response may include information associated with a second device (e.g., the second device 104) that is available to establish a D2D connection (e.g., the D2D communication link 160) with the first device.

Figure 10:
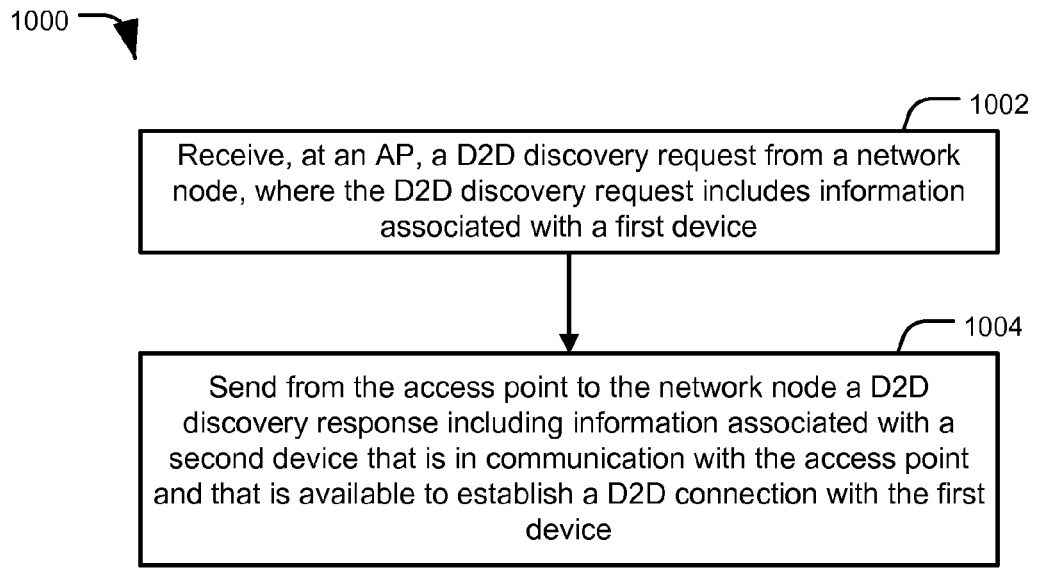
FIG. 10 is a flowchart to illustrate another particular embodiment of a method of operation at the system of FIG. 1.

FIG. 10 is a flowchart of an illustrative embodiment of a method 1000 of operation at the access point 120 of FIG. 1. The method 1000 may include receiving, at an AP, a D2D discovery request (e.g., the discovery request 180) from a network node (e.g., the server 110 of FIG. 1), at 1002. The D2D discovery request may include information associated with a first device (e.g., the first device 102). The method 1000 may also include sending from the access point to the network node a D2D discovery response (e.g., the discovery response 182), at 1004. The discovery response may include information associated with a second device (e.g., the second device 104) that is in communication with the access point and that is available to establish a D2D connection (e.g., the D2D communication link 160) with the first device.

Figure 11:
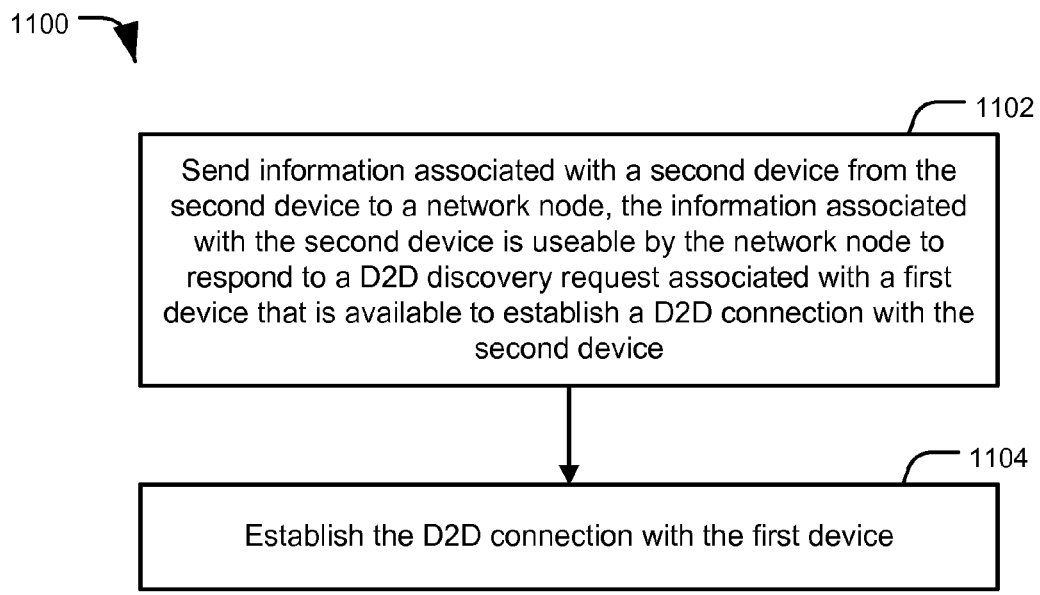
FIG. 11 is a flowchart to illustrate another particular embodiment of a method of operation at the system of FIG. 1.

FIG. 11 is a flowchart of an illustrative embodiment of a method 1100 of operation at the second device 104 of FIG. 1 (e.g., a neighbor device). The method 1100 may include sending information associated with a second device from the second device to a network node (e.g., the server 110 or the access point 120 of FIG. 1), at 1102. The information associated with the second device is useable by the network node to respond to a D2D discovery request (e.g., the discovery request 170 or the discovery request 180) associated with a first device (e.g., the first device 102) that is available to establish a D2D connection (e.g., the D2D communication link 160) with the second device. The method 1100 may also include establishing the D2D connection with the first device, at 1104.

Figure 12:
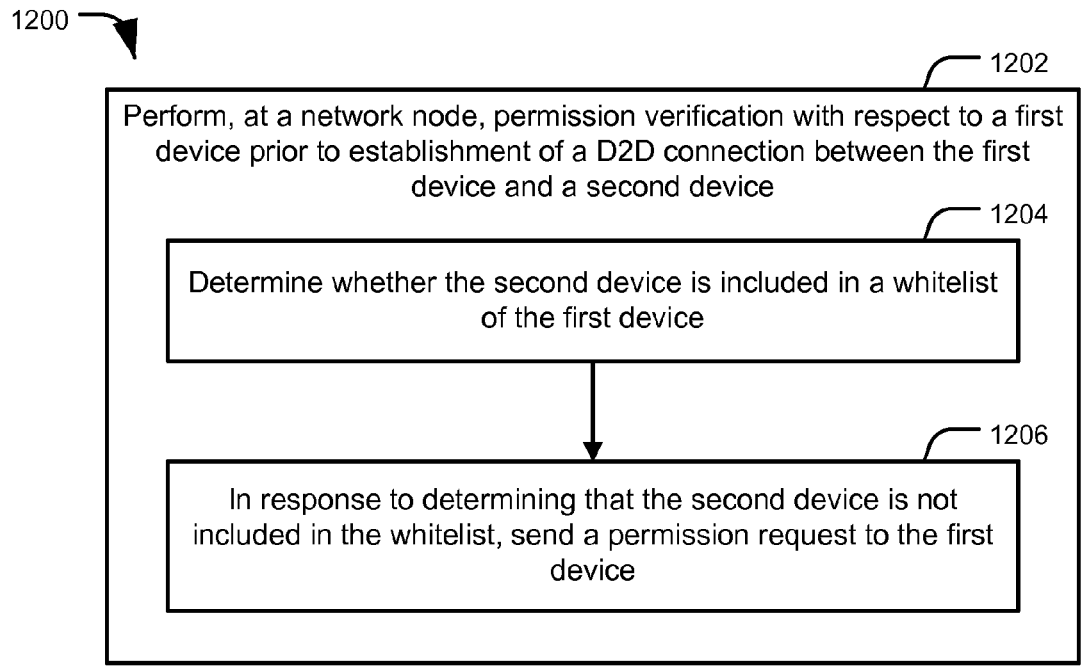
FIG. 12 is a flowchart to illustrate another particular embodiment of a method of operation at the system of FIG. 1.

FIG. 12 is a flowchart of another illustrative embodiment of a method 1200 of operation at a network node (e.g., the D2D connection server 110 of FIG. 1). The method 1200 may include performing, at a network node, permission verification with respect to a first device (e.g., one of the devices 102 or 104) prior to establishment of a D2D connection (e.g., the D2D communication link 160) between the first device and a second device (e.g., the other of the devices 102 or 104), at 1202. The permission verification may include determining whether the second device is included in a whitelist (e.g., the whitelist information 114 of FIG. 1) of the first device, at 1204. The permission verification may also include, in response to determining that the second device is not included in the whitelist, sending a permission request to the first device, at 1206.

Figure 13:
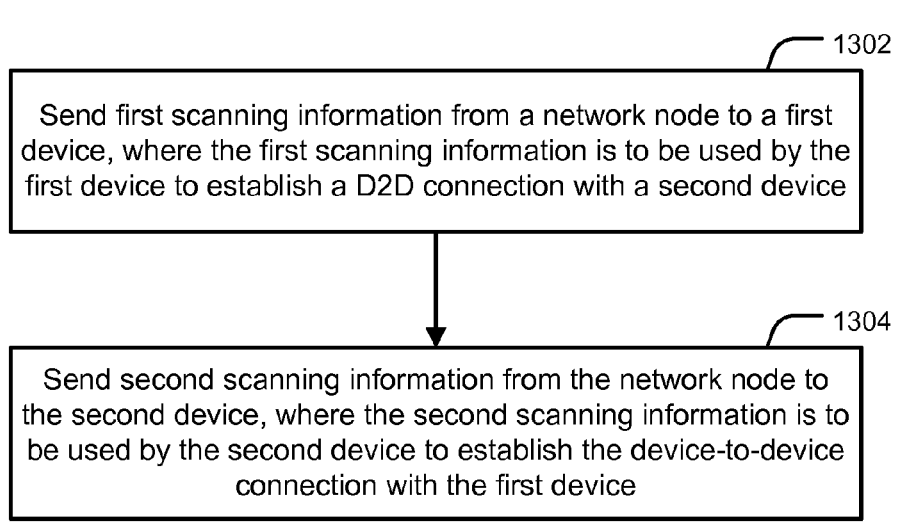
FIG. 13 is a flowchart to illustrate another particular embodiment of a method of operation at the system of FIG. 1.

FIG. 13 is a flowchart of another illustrative embodiment of a method 1300 of operation at a network node (e.g., the D2D connection server 110 of FIG. 1). The method 1300 may include sending first scanning information from a network node to a first device (e.g., the first device 102 of FIG. 1), at 1302. The first scanning information may be used by the first device to establish a D2D connection (e.g., the D2D communication link 160) with a second device (e.g., the second device 104). The method 1300 may also include sending second scanning information from the network node to the second device, at 1304. The second scanning information may be used by the second device to establish the D2D connection with the first device.

Figure 14:
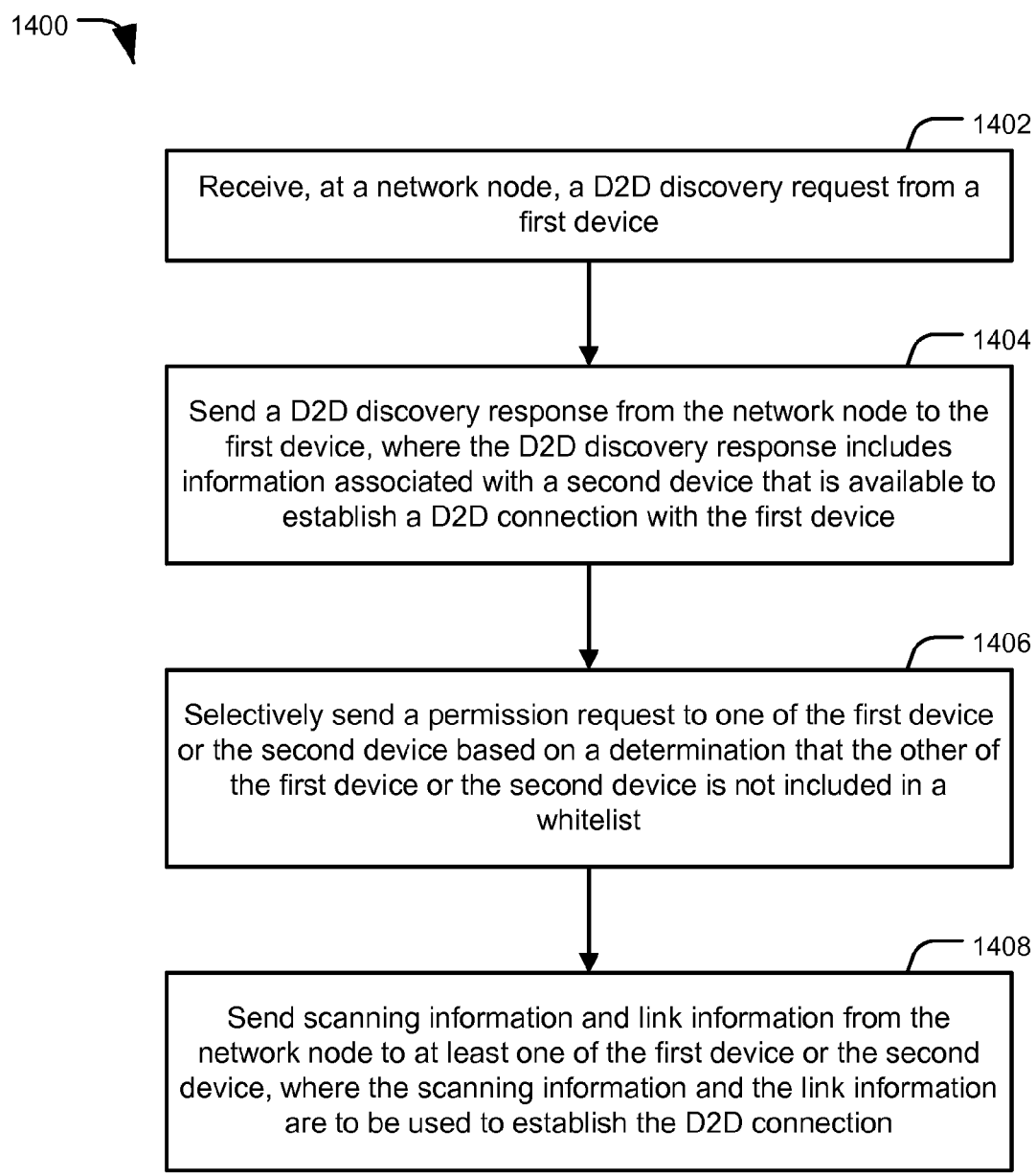
FIG. 14 is a flowchart to illustrate another particular embodiment of a method of operation at the system of FIG. 1.

FIG. 14 is a flowchart of another illustrative embodiment of a method 1400 of operation at a network node (e.g., the D2D connection server 110 of FIG. 1). The method 1400 may include receiving, at a network node, a D2D discovery request (e.g., the discovery request 170 of FIG. 1) from a first device (e.g., the first device 102), at 1402. The method 1400 may also include sending a D2D discovery response (e.g., including the device list 172) from the network node to the first device, at 1404. The D2D discovery response may include information associated with a second device (e.g., the second device 104) that is available to establish a D2D connection (e.g., the D2D communication link 160) with the first device. The method 1400 may further include selectively sending a permission request to one of the first device or the second device based on a determination that the other of the first device or the second device is not included in a whitelist (e.g., the whitelist information 114), at 1406. The method 1400 may include sending scanning information and link information from the network node to at least one of the first device or the second device, at 1408. The scanning information and the link information may be used to establish the D2D connection.

Figure 15:
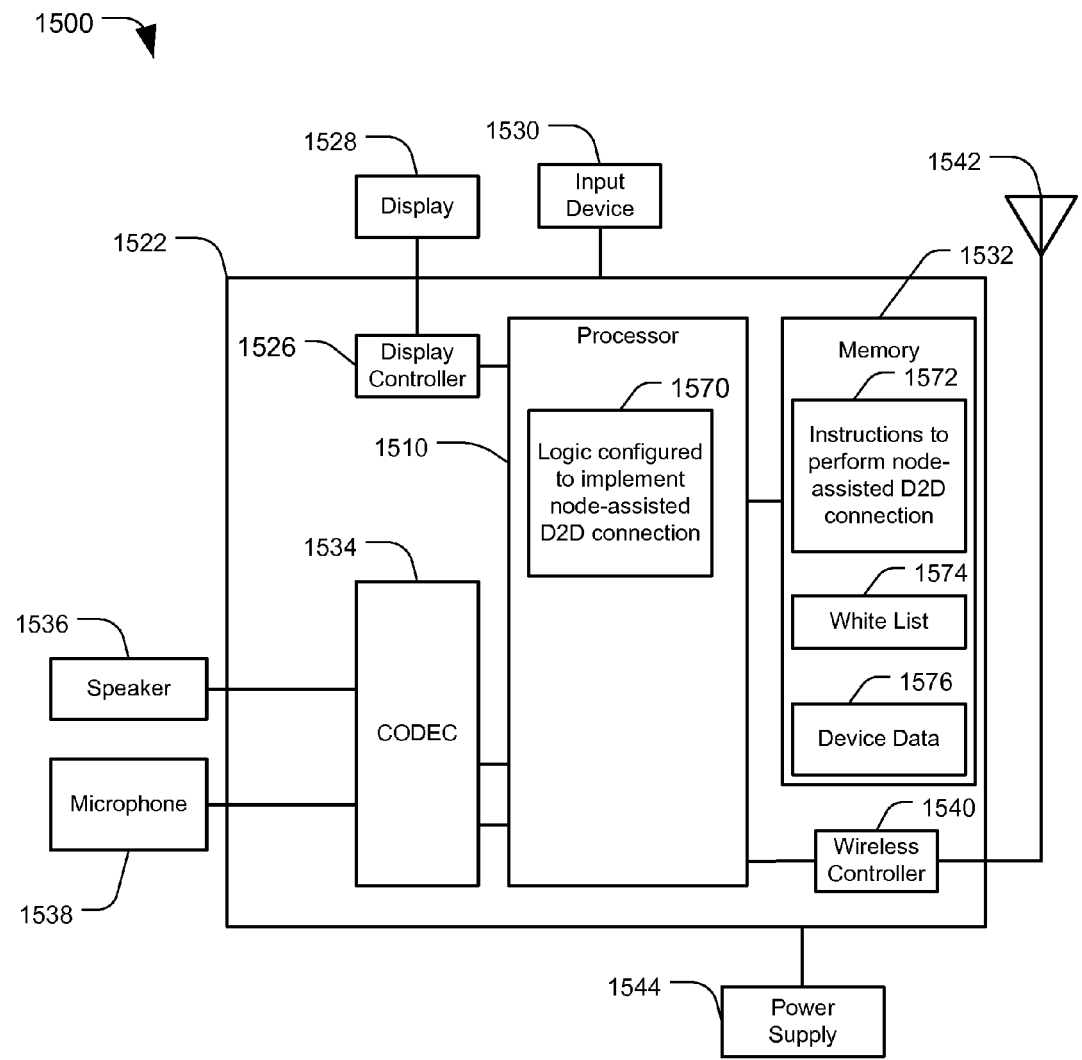
FIG. 15 is a block diagram of a communication device including components that are operable to perform various aspects of operations described with reference to FIGS. 1-14.

FIG. 15 is a block diagram of a communication device 1500. In one embodiment, the communication device 1500, or components thereof, include or are included within the first device 102 in FIG. 1, the second device 104, the access point 120, a network node (e.g., the D2D connection server 110), or any combination thereof. Further, the messages, functions, and methods described with reference to FIGS. 1-14, or portions thereof, may be performed at or by the communication device 1500, or components thereof. The communication device 1500 includes a processor 1510, such as a digital signal processor (DSP), coupled to a memory 1532.

The memory 1532 may be a non-transitory tangible computer-readable and/or processor-readable storage device that stores instructions. The instructions may include instructions 1572 executable by the processor 1510 to perform node-assisted D2D connection (e.g., one or more functions or methods described with reference to FIGS. 1-14). The memory 1532 may also store whitelist information 1574 (e.g., the whitelist information 114 of FIG. 1) and/or device data 1576 (e.g., the device information 112 and/or 122 of FIG. 1). The memory 1532 may thus store instructions and data to implement sever-assisted D2D connection via software. Alternately, or in addition, sever-assisted D2D connection (or portions thereof) may be implemented using hardware. For example, the processor 1510 may include logic 1570 configured to implement such node-assisted D2D connection.

FIG. 15 shows that the communication device 1500 may also include a display controller 1526 that is coupled to the processor 1510 and to a display device 1528. A coder/decoder (CODEC) 1534 can also be coupled to the processor 1510. A speaker 1536 and a microphone 1538 can be coupled to the CODEC 1534. FIG. 15 also indicates that a wireless controller 1540 may be coupled to the processor 1510, where the wireless controller 1540 is in communication with an antenna 1542 (e.g., via a transceiver). The wireless controller 1540 and the antenna 1542 may thus represent a wireless interface that enables wireless communication by the communication device 1500. The communication device 1500 may include numerous wireless interfaces, where different wireless networks are configured to support different networking technologies or combinations of networking technologies (e.g., IEEE 802.11, Wi-Fi Direct, Bluetooth, Bluetooth low energy, Near-field communication, cellular (e.g., third generation (3G) or fourth generation (4G), etc.)).

In a particular embodiment, the processor 1510, the display controller 1526, the memory 1532, the CODEC 1534, and the wireless controller 1540 are included in a system-in-package or system-on-chip device 1522. In a particular embodiment, an input device 1530 and a power supply 1544 are coupled to the system-on-chip device 1522. Moreover, in a particular embodiment, as illustrated in FIG. 15, the display device 1528, the input device 1530, the speaker 1536, the microphone 1538, the antenna 1542, and the power supply 1544 are external to the system-on-chip device 1522. However, each of the display device 1528, the input device 1530, the speaker 1536, the microphone 1538, the antenna 1542, and the power supply 1544 can be coupled to a component of the system-on-chip device 1522, such as an interface or a controller.

One or more of the disclosed embodiments may be implemented in a system or an apparatus that includes a portable music player, a personal digital assistant (PDA), a mobile location data unit, a mobile phone, a cellular phone, a computer, a tablet, a portable digital video player, or a portable computer. Additionally, the system or the apparatus may include a communications device, a fixed location data unit, a set top box, an entertainment unit, a navigation device, a monitor, a computer monitor, a television, a tuner, a radio, a satellite radio, a music player, a digital music player, a video player, a digital video player, a digital video disc (DVD) player, a desktop computer, any other device that stores or retrieves data or computer instructions, or a combination thereof. As another illustrative, non-limiting example, the system or the apparatus may include remote units, such as global positioning system (GPS) enabled devices, navigation devices, fixed location data units such as meter reading equipment, or any other device that stores or retrieves data or computer instructions, or any combination thereof. Although one or more of FIGS. 1-15 illustrate systems, apparatuses, and/or methods according to the teachings of the disclosure, the disclosure is not limited to these illustrated systems, apparatuses, and/or methods. Embodiments of the disclosure may be suitably employed in any device that includes a memory, a processor, and circuitry.

In conjunction with the described embodiments, an apparatus includes means for sending first scanning information from a network node to a first device, where the first scanning information is to be used by the first device to establish a D2D connection with a second device. The apparatus also includes means for sending second scanning information from the network node to the second device, where the second scanning information is to be used by the second device to establish the D2D connection with the first device. For example, the means for sending the first scanning information and the means for sending the second scanning information may each include a component of a network node (e.g., the D2D connection server 110), a component of an access point (e.g., the access point 120), the wireless controller 1540, the antenna 1542, another device configured to send scanning information, or any combination thereof.

The apparatus may also include means for sending link setup information including a first credential from the network node to the first device. For example, the means for sending the link setup information may include a component of a network node (e.g., the D2D connection server 110), a component of an access point (e.g., the access point 120), the wireless controller 1540, the antenna 1542, another device configured to send scanning information, or any combination thereof. The apparatus may further include means for generating a first credential and a second credential at a network node. For example, the means for generating may include a component of a network node (e.g., the D2D connection server 110), a component of an access point (e.g., the access point 120), the processor 1510, another device configured to generate credentials, or any combination thereof. The apparatus may include means for periodically sending an updated common credential to each of a plurality of managed devices. For example, the means for sending the updated common credential may include a component of a network node (e.g., the D2D connection server 110), a component of an access point (e.g., the access point 120), the wireless controller 1540, the antenna 1542, another device configured to send an updated common credential, or any combination thereof.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above (e.g., any operation illustrated in FIGS. 1-15) may be performed by any suitable means capable of performing the operations, such as various hardware and/or software component(s), circuits, and/or module(s). Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array (FPGA), a programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer readable storage media and communication media including any medium that facilitates transfer of computer program data from one place to another. A storage media may be any available media that can be accessed by a computer. By way of example, and not limitation, such computer readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store program code in the form of instructions or data and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk where disks usually reproduce data magnetically, while discs reproduce data optically with lasers. Thus, in some aspects computer readable medium may include a non-transitory computer readable medium (e.g., tangible media). Combinations of the above should also be included within the scope of computer-readable media.

The methods disclosed herein include one or more steps or actions. The method steps and/or actions may be interchanged with one another without departing from the scope of the claims. In other words, unless a specific order of steps or actions is specified, the order and/or use of specific steps and/or actions may be modified without departing from the scope of the disclosure.

Certain aspects may include a computer program product for performing the operations presented herein. For example, a computer program product may include a computer-readable storage medium having instructions stored (and/or encoded) thereon, the instructions being executable by one or more processors to perform the operations described herein. The computer program product may include packaging material.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, or a physical storage medium such as a compact disc (CD)). Moreover, any other suitable technique for providing the methods and techniques described herein can be utilized. It is to be understood that the scope of the disclosure is not limited to the precise configuration and components illustrated above.

The previous description of the disclosed embodiments is provided to enable a person skilled in the art to make or use the disclosed embodiments. While the foregoing is directed to aspects of the present disclosure, other aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
   receiving, at a network node, a device-to-device (D2D) discovery request from a first device;
   receiving, at the network node, a list of a plurality of neighboring devices from an access point (AP), wherein each of the plurality of neighboring devices is within a threshold distance of the first device and includes a service identified in the D2D discovery request;
   sending a D2D discovery response from the network node to the first device, wherein the D2D discovery response includes information associated with a first neighboring device of the plurality of neighboring devices; and
   determining whether to initiate a D2D connection based on a response to a permission request from the first neighboring device.

2. The method of claim 1, wherein the network node comprises a server, a network controller, an access point, or a mobile station that is distinct from the first device and the first neighboring device.

3. The method of claim 1, wherein the D2D discovery request and the D2D discovery response are communicated via a non-D2D link.

4. The method of claim 3, wherein the non-D2D link comprises a cellular link.

5. The method of claim 1, wherein the D2D discovery request identifies one or more services, a transmit power of the first device, a receiver sensitivity of the first device, a location of the first device, a threshold proximity of candidate neighbor devices to the first device, or any combination thereof.

6. The method of claim 1, wherein the D2D connection comprises a Wi-Fi Direct connection.

7. The method of claim 1, further comprising:
   identifying the first neighbor device based on information stored at the network node or the access point.

8. The method of claim 7, wherein the information associated with the first neighbor device identifies a location of the first neighbor device, a capability of the first neighbor device, a channel number of the first neighbor device, a wake-up schedule of the first neighbor device, a beacon transmission schedule of the first neighbor device, a whitelist of the first neighbor device, a service provided by the first neighbor device, a group owner preference of the first neighbor device, or any combination thereof.

9. The method of claim 1, wherein the access point sends a second D2D discovery request to the first neighbor device and receives at least a portion of the information associated with the first neighbor device from the first neighbor device in response to the second D2D discovery request, wherein the portion of the information associated with the first neighbor device identifies a location of the first neighbor device, a capability of the first neighbor device, a channel number of the first neighbor device, a wake-up schedule of the first neighbor device, a beacon transmission schedule of the first neighbor device, a whitelist of the first neighbor device, a service provided by the first neighbor device, a group owner preference of the first neighbor device, or any combination thereof.

10. The method of claim 9, wherein the access point sends the second D2D discovery request in response to determining that the first neighbor device satisfies at least one criterion.

11. The method of claim 10, wherein the at least one criterion is satisfied when the first neighbor device can provide at least one service requested by the first device.

12. An apparatus comprising:
    a processor; and
    a memory storing instructions executable by the processor to perform operations comprising:
      receiving, at a second device, a device-to-device (D2D) discovery request associated with a first device that is available to establish a D2D connection with the second device, wherein the D2D discovery request includes location information of the first device and a service requested by the first device; and in response to determining, at the second device, whether the first device is within a threshold distance from the second device and whether the second device is operable to provide the requested service via a D2D communication link, sending an indicator from the second device to a network node to indicate whether the second device is available for D2D communication.

13. The apparatus of claim 12, wherein the operations further comprise sending an unavailability indicator from the second device to the network node to indicate that the second device is unavailable for D2D communication, wherein the unavailability indicator is sent when a traveling speed of the second device is greater than a speed threshold and a battery power of the second device is less than a battery threshold, or a combination thereof.

14. The apparatus of claim 12, wherein the operations further comprise sending an availability indicator from the second device to the network node to indicate that the second device is available for D2D communication, wherein the availability indicator is sent when a traveling speed of the second device is less than a speed threshold and a battery power of the second device is greater than a battery threshold.

15. The apparatus of claim 12, wherein the second device sends information to the network node when the second device is available for D2D communication.

16. The apparatus of claim 15, wherein the second device is not considered by the network node for D2D communication while the second device is unavailable for D2D communication.

17. The apparatus of claim 12, wherein the operations further comprise:
generating a permission request at the second device; and
selectively sending information associated with the second device from the second device to the network node based on a response to the permission request.

18. The apparatus of claim 12, wherein the operations further comprise:
selectively sending information associated with the second device from the second device to the network node based on a determination that the first device is included in a whitelist of the second device.

19. The apparatus of claim 12, wherein the operations further comprise:
selectively sending information associated with the second device from the second device to the network node based on a determination that the first device is within a threshold distance of the second device and that the second device is within a threshold distance of the first device.

20. The apparatus of claim 12, wherein the operations further comprise:
selectively sending information associated with the second device from the second device to the network node based on a determination that the second device can provide at least one service requested by the first device.

21. The apparatus of claim 12, wherein the operations further comprise:
selectively sending information associated with the second device from the second device to the network node when a battery power of the second device is greater than a battery threshold and a traveling speed of the second device is less than a speed threshold.

22. A computer-readable storage device storing instructions that, when executed by a processor, cause the processor to perform operations comprising:
performing, at a network node, first permission verification with respect to a first device prior to establishment of a device-to-device (D2D) connection between the first device and a second device, wherein performing the first permission verification comprises:
receiving a D2D discovery request from the first device, the D2D discovery request identifying, a transmit power of the first device, a receiver sensitivity of the first device, or both;
detecting the second device in response to receiving the D2D discovery request;
determining whether the second device is included in a first whitelist of the first device in response to detecting the second device; and
in response to determining that the second device is not included in the first whitelist, sending a first permission request to the first device for establishing a D2D connection with the second device.

23. The computer-readable storage device of claim 22, wherein the operations further comprise performing second permission verification with respect to the second device, wherein performing the second permission verification comprises:
determining whether the first device is included in a second whitelist of the second device; and
in response to determining that the first device is not included in the second whitelist, sending a second permission request to the second device.

24. The computer-readable storage device of claim 22, wherein the operations further comprise:
sending a list of candidate neighbor devices from the network node to the first device for permission verification;
receiving from the first device a list of permitted neighbor devices and a connection prioritization indication for each of the permitted neighbor devices; and
initiating D2D link setup between the first device and one or more of the permitted neighbor devices based on the connection prioritization indications.

25. An apparatus comprising:
means for receiving a device-to-device (D2D) discovery request at a network node from a first device, the D2D discovery request identifying a transmit power of the first device, a receiver sensitivity of the first device, or both;
means for sending first scanning information from the network node to the first device in response to receiving the D2D discovery request, wherein the first scanning information is to be used by the first device to establish a D2D connection with a second device;
means for sending second scanning information from the network node to the second device, wherein the second scanning information is to be used by the second device to establish the D2D connection with the first device; and
means for sending, from the network node to the first device, link setup information that includes a first security credential of the second device.

26. The apparatus of claim 25, further comprising: means for sending link setup information including a first credential from the network node to the first device, wherein the first scanning information comprises an identifier of the second device, a channel number of the second device, a wake-up schedule of the second device, a beacon transmission schedule of the second device, a location of the second device, or any combination thereof, and wherein the first security credential comprises a public/private key pair, a shared secret, a pre-shared key (PSK), a certificate, or any combination thereof.

27. The apparatus of claim 26, wherein the second device is a group owner (GO) and wherein the network node stores the first security credential from the second device prior to receiving the D2D discovery request from the first device and prior to receiving a D2D discovery request from the second device.

28. The apparatus of claim 26, further comprising:
means for generating the first security credential and a second security credential at the network node, wherein the first security credential and the second security credential represent a common credential, and wherein the network node sends the common credential to each of a plurality of managed devices prior to receiving the D2D discovery request from the first device and prior to receiving a D2D discovery request from the second device; and
means for periodically sending an updated common credential to each of the plurality of managed devices.

* * * * *